US010818084B2

(12) United States Patent
Alpert et al.

(10) Patent No.: US 10,818,084 B2
(45) Date of Patent: Oct. 27, 2020

(54) DYNAMICALLY CUSTOMIZED THREE DIMENSIONAL GEOSPATIAL VISUALIZATION

(71) Applicant: Geopogo, Inc., Berkeley, CA (US)

(72) Inventors: David Alpert, Berkeley, CA (US); Gabriele Sorrento, Bari (IT)

(73) Assignee: Geopogo, Inc., Berkeley, CA (US)

( * ) Notice: Subject to any disclaimer, the term of this patent is extended or adjusted under 35 U.S.C. 154(b) by 328 days.

(21) Appl. No.: 15/092,400

(22) Filed: Apr. 6, 2016

(65) Prior Publication Data

US 2016/0299661 A1 Oct. 13, 2016

Related U.S. Application Data

(60) Provisional application No. 62/144,193, filed on Apr. 7, 2015.

(51) Int. Cl.
| | |
|---|---|
| G06F 3/0481 | (2013.01) |
| G06T 17/05 | (2011.01) |
| H04L 29/08 | (2006.01) |
| G06F 3/01 | (2006.01) |
| G06Q 30/00 | (2012.01) |
| G06T 19/00 | (2011.01) |
| H04L 29/06 | (2006.01) |

(52) U.S. Cl.
CPC .............. *G06T 17/05* (2013.01); *G06F 3/011* (2013.01); *G06Q 30/00* (2013.01); *G06T 19/003* (2013.01); *H04L 67/18* (2013.01); *H04L 67/306* (2013.01); *H04L 67/38* (2013.01)

(58) Field of Classification Search
CPC ...... G06F 3/04815; G06F 3/011; H04L 67/18; H04L 67/306; G06T 15/10
See application file for complete search history.

(56) References Cited

U.S. PATENT DOCUMENTS

| | | | | |
|---|---|---|---|---|
| 7,840,903 | B1* | 11/2010 | Amidon | G06F 3/04815 |
| | | | | 715/733 |
| 9,223,469 | B2* | 12/2015 | Neustaedter | A63F 13/12 |
| 2009/0276705 | A1* | 11/2009 | Ozdemir | G06K 9/00771 |
| | | | | 715/708 |
| 2010/0205035 | A1* | 8/2010 | Baszucki | G06Q 20/102 |
| | | | | 705/14.12 |
| 2011/0102460 | A1* | 5/2011 | Parker | G06T 19/006 |
| | | | | 345/633 |
| 2011/0106595 | A1* | 5/2011 | Vande Velde | G06Q 30/02 |
| | | | | 705/14.4 |
| 2011/0264536 | A1* | 10/2011 | Chodroff | G06Q 30/00 |
| | | | | 705/14.69 |
| 2013/0002649 | A1* | 1/2013 | Wu | G06T 19/006 |
| | | | | 345/419 |

(Continued)

*Primary Examiner* — Rashawn N Tillery
(74) *Attorney, Agent, or Firm* — Chhabra Law Firm, PC

(57) ABSTRACT

Using various embodiments, methods, and systems for implementing a dynamically customized three dimensional geospatial visualization techniques in a point cloud are disclosed. In one embodiment, a user's current area of interest can be determined to generate a dynamically customized three dimensional geospatial setting. In one embodiment, the area of interests can be determined based on a user's actions, behavior, and/or preferences. The geospatial (exterior or interior) settings or the content displayed within the settings can be dynamically customized in real time for each user.

17 Claims, 18 Drawing Sheets

(56) References Cited

U.S. PATENT DOCUMENTS

| | | | |
|---|---|---|---|
| 2013/0282208 A1* | 10/2013 | Mendez-Rodriguez | ............................ G01S 17/89 701/16 |
| 2014/0122220 A1* | 5/2014 | Bradley | ............. G06Q 30/0267 705/14.42 |
| 2014/0237392 A1* | 8/2014 | Hoomani | ................ H04L 51/32 715/757 |
| 2014/0300775 A1* | 10/2014 | Fan | .................... H04N 5/23229 348/231.3 |
| 2016/0163205 A1* | 6/2016 | Jenkins | ................ G08G 5/0069 701/3 |
| 2016/0196687 A1* | 7/2016 | Alpert | .................... G06T 17/05 345/419 |
| 2016/0379366 A1* | 12/2016 | Shah | ........................ G06T 7/38 345/419 |
| 2017/0255019 A1* | 9/2017 | Lyons | ................ G02B 27/0172 |
| 2018/0040137 A1* | 2/2018 | Barajas Hernandez | ............................ G06K 9/00637 |
| 2018/0107346 A1* | 4/2018 | Wilson | ............... G01C 21/3673 |

\* cited by examiner

DYNAMICALLY CUSTOMIZED THREE DIMENSIONAL GEOSPATIAL VISUALIZATION

CROSS REFERENCE TO RELATED APPLICATIONS

The present application claims priority from U.S. Provisional Patent Application No. 62/144,193 filed on Apr. 7, 2015, under 35 U.S.C. 119(e), the contents of the above mentioned provisional patent application is incorporated herein by reference, for all purposes to the extent that such subject matter is not inconsistent herewith.

FIELD OF THE INVENTION

Embodiments of the present invention generally relate to the field of three dimensional visualization of geospatial data. More particularly, embodiments of the invention relate to a mechanism to present a unified indoor/outdoor representation of structures, buildings, and objects using geospatial data that can be dynamically customized for a user's convenience.

BACKGROUND OF THE INVENTION

Conventional methods simulate three-dimensional geospatial visualization techniques using two-dimensional imagery. Such conventional methods include joining multiple individual images, e.g., panoramic bubble images, satellite images, photogrammetry, etc. However, such imagery is not unified and movement is restricted to the vantage point of the source of the two dimensional images. This limits the viewer's freedom to move through and explore a given setting. Moreover, conventional methods deprive the user of an enhanced experience of browsing through a virtual world that is based on realistic geographical features.

Thus, what is needed are techniques that provide a unified indoor/outdoor three dimensional visualization of exterior and interior settings that can provide an enhanced and fulfilling user experience. Such techniques should be capable of letting the user perform various actions to enhance a free movable experience inside or outside buildings, structures, etc., while not limited by the vantage point of the source of a two-dimensional image. Furthermore, such techniques should be capable of providing (and catering to) multiple user experiences, including vehicular, bicyclists, pedestrian, etc.

SUMMARY OF THE INVENTION

Using various embodiment, a methods, systems, and non-transitory computer readable medium comprising instructions for transmitting dynamically customized three-dimensional (3D) rendering of geospatial data have been described. In one embodiment, the invention includes determining at least one area of interest of a user and dynamically customizing a global positioning system (GPS) coordinated 3D point cloud data related to a location based on the user's area(s) of interest. The GPS coordinated 3D point cloud data related to the location can be transmitted to a client computer from a server, and upon receiving data related to the user's position in the 3D point cloud data from the client computer, the server can periodically determine the GPS coordinates of the user. There after, the server determines whether updated point cloud data needs to be transmitted to the client computer based on the GPS coordinates of the user, and if so, the server transmits the point cloud data to the client computer.

In one embodiment, the server computer can be configured to determine at least one area of interest of a user, dynamically customize a GPS coordinated 3D point cloud data related to a location based on the determining of the at least one area of interest of the user, transmit the GPS coordinated 3D point cloud data related to the location, periodically determine the GPS coordinates of the user in the point cloud data, determine whether updated point cloud data needs to be transmitted device based on the GPS coordinates of the user, and transmit the point cloud data when it is determined that an updated point cloud data needs to be transmitted.

In one embodiment, the client computer can be configured to receive, from the server computer, global positioning system (GPS) coordinated three-dimensional (3D) point cloud data related to a location, render the point cloud data to depict a 3D view of the location, receive information from the server computer related to at least one area of interest of a user, and display the information on the rendered point cloud data.

In another embodiment, the user's area of interest is determined based on at least one of an action, behavior, or preference of the user. In one embodiment, the point cloud data is dynamically customized based on the user's area of interest in placeholder locations provided by the system. In another embodiment, the placeholder locations in a store are determined by a merchant user. In one embodiment, the user's area of interest is determined by the profile information of the user, and in another embodiment, the user's area of interest can be refined based on repeated or frequent actions of the user. In one embodiment, the 3D point cloud data relates to realistic geographical location settings or fantasized geographical location settings, or a combination thereof.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
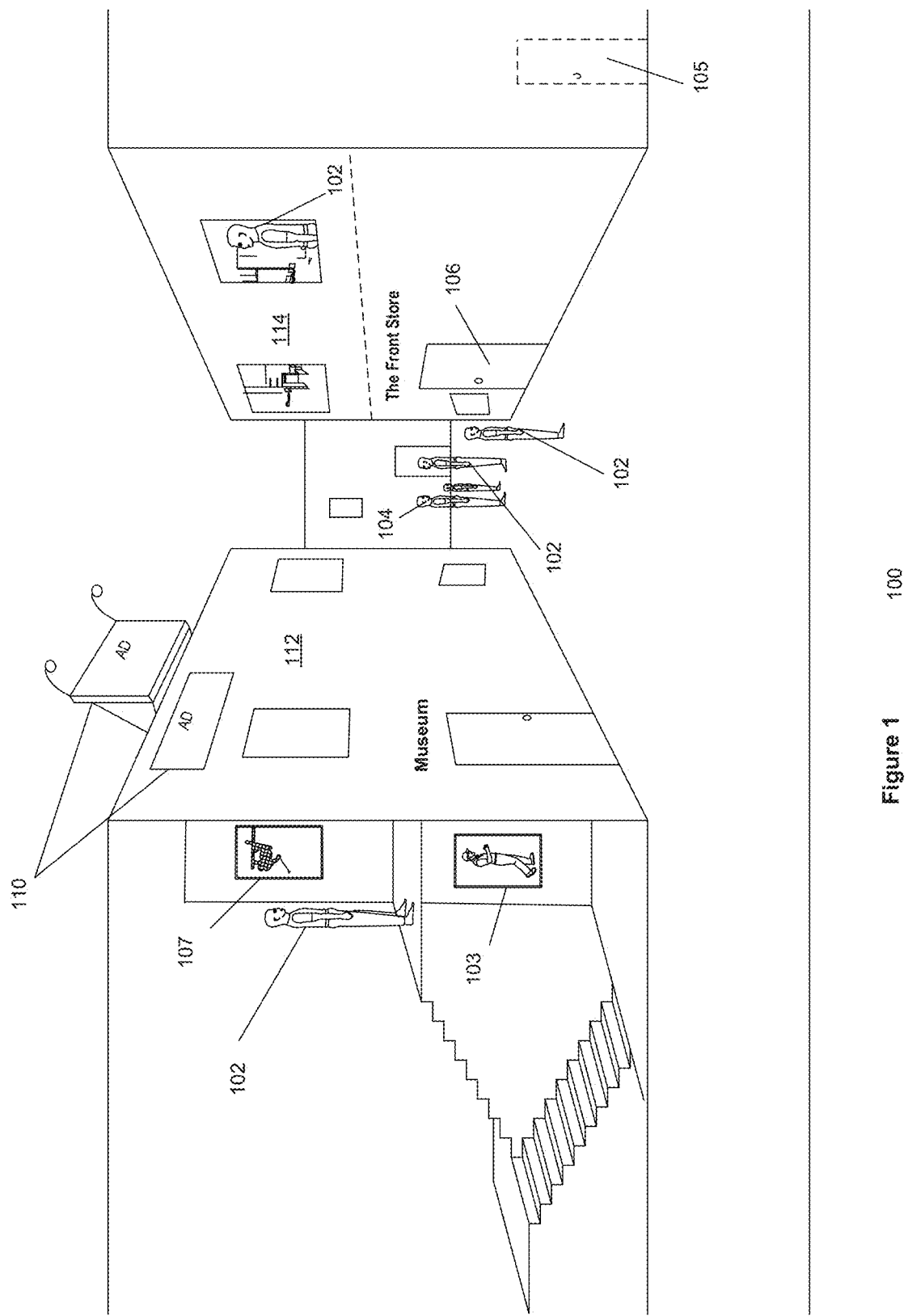
FIG. 1 illustrates a diagram describing the actions that can be generally performed by a user according to an embodiment of the invention.

Various embodiments of three dimensional geospatial visualization techniques disclosed in Co-pending U.S. patent application Ser. No. 14/987,349, filed on Jan. 4, 2016, can be employed, in whole or in part, with the present invention. As a result, the above-identified disclosure is incorporated herein by reference in its entirety to the extent that such subject matter is not inconsistent herewith.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

A user's persona is a virtual self of a user/person, according to any embodiment of the invention, as disclosed herein.

An interior or exterior setting is the manner, position, or direction in which a geospatial object (e.g., exterior surroundings like building, structure, street, etc.) or a non-geospatial object (e.g., interior surroundings like objects within a building or structure, vehicles, street signs, street lighting, etc.), is set and displayed, according to any embodiment of the invention, as disclosed herein.

A three dimensional (3D) coordinated point cloud is a set of data points in a three-dimensional (X, Y, and Z) coordinate system that is intended to represent the external surface of a geospatial or non geospatial object. Digital representations of point clouds can be created using 3D object scanners or other methods and stored in one or more data files. A point cloud represents the set of points that can be processed to render a virtual representation of the scanned geospatial or non-geospatial object, according to any embodiment of the invention, as disclosed herein.

A three dimensional point cloud can render a set of data points into a feature. A Feature, as described herein in this disclosure, generally refers to anything the system will dynamically provide to the user and the user can interact with, (e.g., a 3D representation of a product, a fair, an advertisement, etc.).

The innovative subject matter of the present invention provides mechanisms and techniques to display, virtually experience, and interact with 3D geospatial models comprising geospatial objects and non-geospatial objects, including the interior and exterior settings, streets, roads, alleys, buildings, structures, other objects, etc. that can be dynamically customized. In one embodiment, a system is implemented using the techniques described herein where the geospatial 3D models are displayed to a user using a website where a user can log-in (e.g., client-server model). In one embodiment, the customization described herein is based on a user's browsing behavior, actions, and/or preferences, providing the user a unique and enhanced virtual browsing experience in a 3D geospatial setting. The system logs the user into a GPS-coordinated three dimensional (3D) point cloud that can be dynamically customized based on a user's browsing behavior, experience, and/or preferences. In one embodiment, based on a user's browsing behavior, experience, and/or preferences, a heuristic approach can be used to determine a user's area of interest.

The exterior settings, in an embodiment, provides a representation of the physical location presented by the GPS coordinates, the interior settings can be presented in a variety of 3D representations, including both realistic settings or fantasized settings, or a combination thereof. In one embodiment, property owners or tenants can pay for permission to "dock" 3D models/places of business to GPS-coordinated exterior and interior world. In one embodiment, merchants or residents can be offered to rent "virtual estate," having their own customized interior and/or exterior storefronts. The virtualized places of business or residence can be locked and unlocked by means of an electronic code to prevent access and/or view by unauthorized persona, but allow access by an authorized persona. In another embodiment, the places of business are unlocked to unauthorized persona(s)/user(s) during specific hours (e.g., business hours), but can be accessed by authorized persona(s)/user(s) at all times. In one embodiment, the user accessing a system implementing the techniques described herein, is provided an opportunity to buy/sell merchandise in a 3D settings in or adjacent to a realistically or fantasized 3D rendition of a customized representation of the world based on the user's preference. In one embodiment, users can be visually notified when transitioning from a simulated realistic setting such as a well-known street to a fantasy setting such as an interior 3D setting inside a business fronting on that street. Thus, in such an embodiment, users can understand and/or differentiate the parts of the 3D environment that simulate reality, fantasy, or a combination thereof. In yet another embodiment, users can be visually notified when presented with personally-customized settings such as a retail interior where merchandise typical to their prior purchases has been arranged for their benefit, a museum where the artwork on display is typical to their prior choices, etc. In such an embodiment, users can choose between the personally-customized setting and a non-customized setting.

In one embodiment, the 3D models/places of business or residence described herein can be dynamically customized according to a user's liking which can be determined heuristically based on a user's browsing actions, behavior, and/or preferences.

A user's browsing actions can include: such things as clicking at a location in the virtual world (e.g., interior or exterior setting), purchasing goods, communicating with other users about a subject matter, searching keywords, current or previous browsing history, interacting with a feature, etc.

A user's behavior includes determining the time spent performing a certain action and the action performed in conjunction with the current location (e.g., GPS coordinates) of the user, current date, time, day, month, season, festival, occasion, etc. (that is, an attempt to determine why the user performed the action).

A user's preferences can be determined by a user's profile information and can be further refined based on a user's repeated/frequent actions and behaviors.

Thus, by combining the above, at least in part, a heuristic approach can be employed to determine a user's area of interest and customize the geospatial settings accordingly, thereby providing the user an enhanced and/or interactive experience. In another embodiment, such customization techniques can also be employed to provide targeted advertisements, goods, merchandize, services, information, etc. to the user. Further, in one embodiment, the user is presented an opportunity to overlay individually-tailored information on the geospatial model based on the determined area of interest pertaining to the user.

In another embodiment, a system implementing the techniques described herein, can be configured to change the interior or exterior settings depending on the time, date, month, national or religious holiday, etc. For example, street fairs or discount fairs, religious festivities, etc., can be created in the exterior or interior setting of an embodiment. In another embodiment, such settings can be customized based on each user's preference, browsing actions, behavior, etc., to provide each user a customizable experience. Thus, in an embodiment, a given setting can be displayed as a virtual fair for one user, while the street can be a realistic rendition (with no fair) for another user. Once a user's persona is within the customized setting represented by the 3D point cloud, the user can realistically browse and experience that setting and perform actions (e.g., shopping, viewing, walking, etc.). Such customizations can further be tailored based on a user's preferences of movement. For example, movement in virtual world can be set to various speeds, such as pedestrian speed, bicycle speed, automobile speed, airplane speed, or balloon speed. Thus, the geospatial 3D models/settings can be further customized to accommodate the needs of pedestrians, bicyclists, automobile users, presenting such users a virtual world based on a physical location, customized to enhance a user's experience in the virtual world. The user accessing such a system is given an opportunity to freely explore and interact (in all directions) in a realistic or fantasized rendition of a 3D representation of the world, customized for each user.

In one embodiment, a user can use the geospatial virtual world to simulate actual views from a variety of settings, such as homes, apartments, restaurant tables, hotel rooms, and theater seats, serving as a resource before making reservations or purchases. Users can gain access to performance events in virtual world, regardless of whether they are linked to performance events in real world or a fantasized based on user's actions, behavior, and/or preferences. In one embodiment, an automated or online concierge or guide can assist users to navigate the 3D environment or engage in online activities such as shopping, touring a museum, visiting a convention exhibition hall, etc.

Thus, using various embodiments, the mechanisms described herein provide a near-realistic (or fantasized) experience of a dynamically customized three dimensional virtual world that is based on a realistic exterior representation of a given (actual) physical location.

FIG. 1 illustrates a diagram 100 describing the actions that can be generally performed by a user according to an embodiment of the invention. Diagram 100 generally describes a few different directions in which persona 102 of a user can walk or explore a given GPS coordinated 3D setting. For example, persona 102 can be walking on street 101 or be within buildings 112 or 114. In one embodiment, the exterior settings can provide a representation of the physical location presented by the GPS coordinates, while the interior settings can be rented by merchants or business owners (commercial establishments, centers, art centers, museums, etc.). The exterior settings, in an embodiment, provides a representation of the physical location presented by the GPS coordinates, the interior settings can be presented in a variety of 3D representations, including both realistic settings or fantasized settings, or a combination thereof. Similarly, the interior settings can be displayed in a variety of 3D representations, including both realistic settings or fantasized settings, or a combination thereof.

In one embodiment, real property owners or tenants of a location can pay for permission to "dock" 3D models/places of business or residence to GPS-coordinated exterior and interior world. In one embodiment, a commercial establishment can be offered to rent "virtual estate," having their own customized interior and exterior storefronts. The virtualized places of business or residence can be locked and unlocked by means of an electronic code to prevent access and view by unauthorized persona as discussed above.

As illustrated, FIG. 1 displays the virtual front of three commercial establishments, a museum docked in structure 112, a virtual store called 'the front store', and a hotel in structure 114. In one embodiment, the user accessing such a system is provided an opportunity to buy/sell merchandise in 3D settings in and adjacent to realistically or fantasized 3D rendition of a customized representation of the world based on user preference. Users can purchase goods and services from both exterior and interior settings. For example, in one embodiment, user of persona 102 can visit the exterior of 'the front store', and opt to visit the conventional website of 'the front store'. In one embodiment, such a website is hosted by a system using the techniques described herein. In another embodiment, the system can forward the user to the external website hosting the store of 'the font store'. In yet another embodiment, the user can virtually open any door of a setting (e.g., 'the front store'), and can be presented with a docked 3D model of the interior setting of the establishment. Such interior settings can be a realistic or fantasized rendition of the store. Thus, by entering or passing through door 106 a user can be presented by a realistic or fantasized rendition of the interiors of 'the front store'.

In one embodiment, customized interior models of a store or commercial establishment can be docked based on a user's browsing actions, behavior, and/or preferences. Thus, 'the front store' can be dynamically customized differently for each user. Similarly, persona 102 can be 'visiting' a virtually docked museum by browsing the interior of the 3D model of the museum. In one embodiment, a user can, via persona 102, virtually experience artwork 103/107 presented by the museum. In one embodiment, the artwork on display is docked and customized based on the user's browsing actions, behavior, and/or preferences.

In one embodiment, a user's actions, behavior, and preferences can be determined based on any of the interactions of a user with the system as discussed in co-pending U.S. patent application Ser. No. 14/987,349.

The system in one embodiment can track the user's behavior and/or actions within the three-dimensional geospatial setting in the virtual world. In one embodiment, such behaviors and/or actions coupled with the user's preferences can be available from within the user's profile. Using such actions and/or behaviors or profile information in one embodiment, a user's area of interest can be determined. Such information can be used to generate and/or display customized settings for information pertaining to the user. Thus, in such a manner, a virtual world providing a user an enhanced customized experience can be created for each individual person accessing the system. In one embodiment, any described implementation herein can be provided using heuristic techniques, non-heuristic techniques, or a combination thereof, as known to a person of ordinary skill in the art.

Using a heuristic approach, in one embodiment, a user's area of interest can be determined and relevant information can be displayed at the commercial establishment's virtual location (e.g., based on the commercial establishment's goal, like, more visits to physical (real) location, sales, etc.). Further, in one embodiment, the heuristic approach can also include determining, in real time, the user's conversations with user other users or settings. For example, if user of persona 102 is chatting with user of persona 104 then keywords can be extracted to determine the user's current area of interest. In this manner multiple users may be able to have their own experience of a street and/or buildings in the point cloud while being able to communicate with each other as could have been done in reality by visiting the actual street, building, or structure. In one embodiment, secret doors or passages 105 can be provided that are visible to all or only to certain users, based on their current activity. For example, using a heuristic approach, using the user's actions, behavior, and/or preferences, secret door 105 can act as a gateway that can "transport" the user to a different location (e.g., website, store, sale offer, etc.), that is dynamically customized for each user.

As a non-limiting example, if user of persona 102 visits a museum located in structure 112 and spends more time admiring artwork 107 (representing a skier in action) than artwork 103 (walking man), then the system can, using a heuristic approach, attempt to determine the user's current intentions for logging on to the system. Based on this information, the system can display ski or sports related advertisements (gear, resorts, etc.) at placeholders 110 in the virtual world of user of persona 102. Further, if user of persona 102 chats with user of persona 104 about skiing, the system can track the keywords and further refine the displayed advertisements. Afterwards, if the user decides to visit 'the front store' in structure 114, the system can further predict the user may be interested in skiing gear, especially if 'the front store' is a sports gear or clothing store.

The system can also present persona 102 secret passages/gateways 105 based on the tracked/collected information, as discussed above. If, in one embodiment, the user enters 'the front store' in structure 112 but does not purchase any merchandise, then upon exit from door 106, the system can display secret door 105 with a notification that a limited time special has been offered by a merchant. Such specials can include diverse offers including but not limited to discounts, free shipping, access to secret page on an external website, etc.

Figure 2:
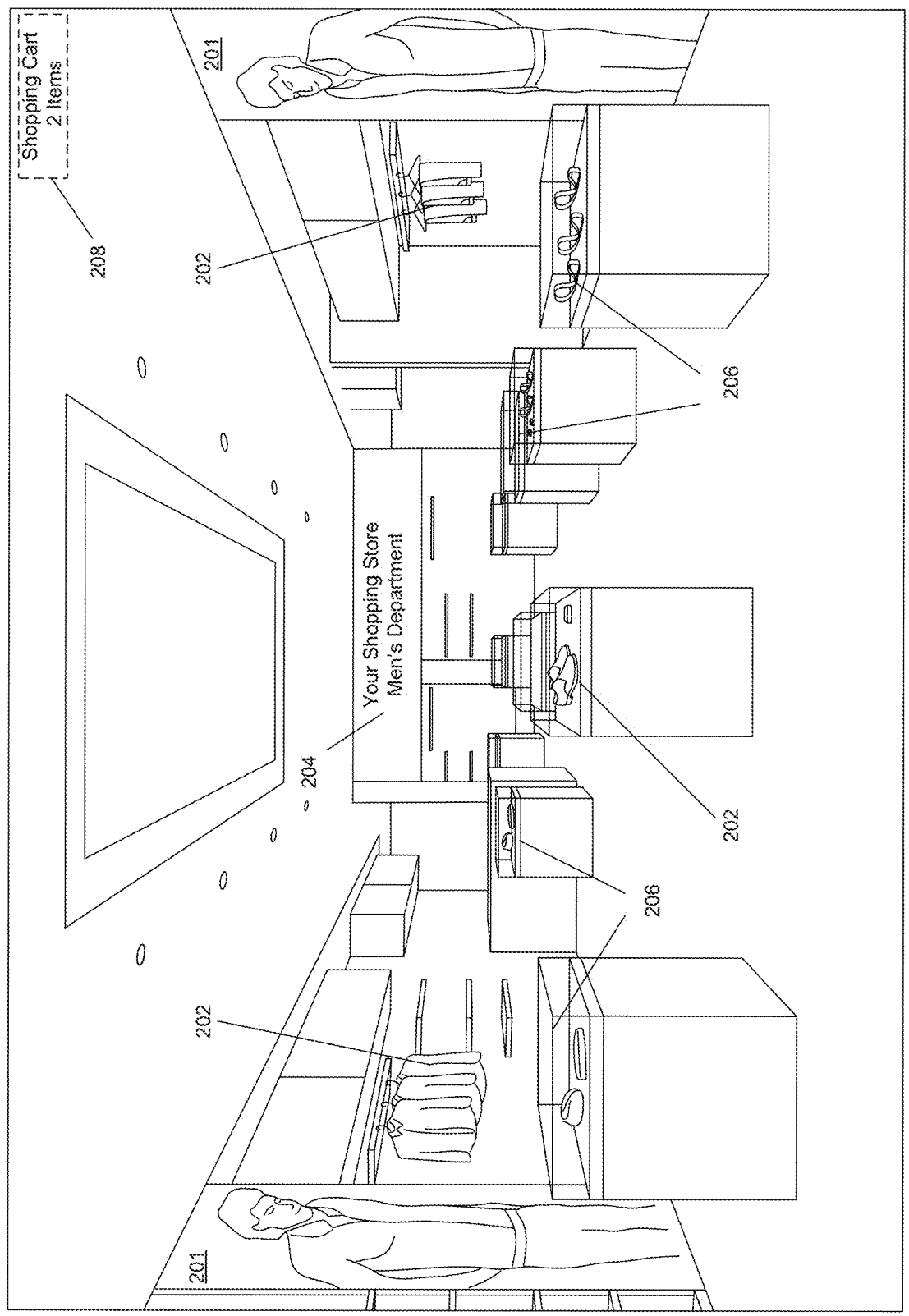
FIG. 2 illustrates a diagram describing a customized three dimensional geospatial setting according to one embodiment of the present invention.

FIG. 2 illustrates a diagram 200 describing a dynamically customized three dimensional geospatial setting according to one embodiment of the present invention. In one embodiment, the 3D models/places of business or residence described herein can be dynamically customized according to a customer's liking which can be determined heuristically based on a user's browsing actions, behavior, and preferences. As discussed above, a user's browsing actions can include: such things as clicking at a location in the virtual world (e.g., interior or exterior setting); purchasing goods; communicating with other users about a subject matter; searching keywords, current or previous browsing history, etc.

FIG. 2 displays, in one embodiment, a dynamically customized three-dimensional rendition of a men's clothing department 200 in a store where a user can virtually browse the store merchandise and or purchase goods. For example, based on the user's preferences, actions, and/or behavior the system can determine the user of persona 102 to be a male or using other factors determine that the user is interested in viewing or purchasing merchandise related to men's clothing. Thus, in one embodiment, as soon as the user enters a store, the relevant store department can be displayed based on a determination of their interest. If it is determined that the user may be interested in buying men's clothing, entering a store can, in one embodiment, display men's clothing department 200. In one embodiment, the user can view or purchase merchandise 202 that is only related to men's clothing, along with other goods 206. In yet another embodiment, hovering over a merchandise (e.g., 202, 206, etc.) can result in a pop-up window notification describing more details about the merchandise, including rich multi-media presentations. In one embodiment, the notification windows can further be linked to other website pages or can be configured to provide purchasing options to the user. In one embodiment, a shopping cart 208 can be displayed to a user while they purchase relevant merchandise.

A store owner or merchant can, in one embodiment, customize their store front by providing placeholders where dynamic content can appear. The placeholders' content and location can be designated by the system or, in another embodiment, can be configured by the store owner. The dynamic content can include, without limitation, customized setting layouts, advertisements, merchandise, etc. Thus, in one embodiment, the store merchant can configure location of content (e.g., advertisement 201, men's clothing 202, and layout sign 204 as placeholders), while designating items placed at 206 as static content, as further illustrated at FIG. 3.

Figure 3:
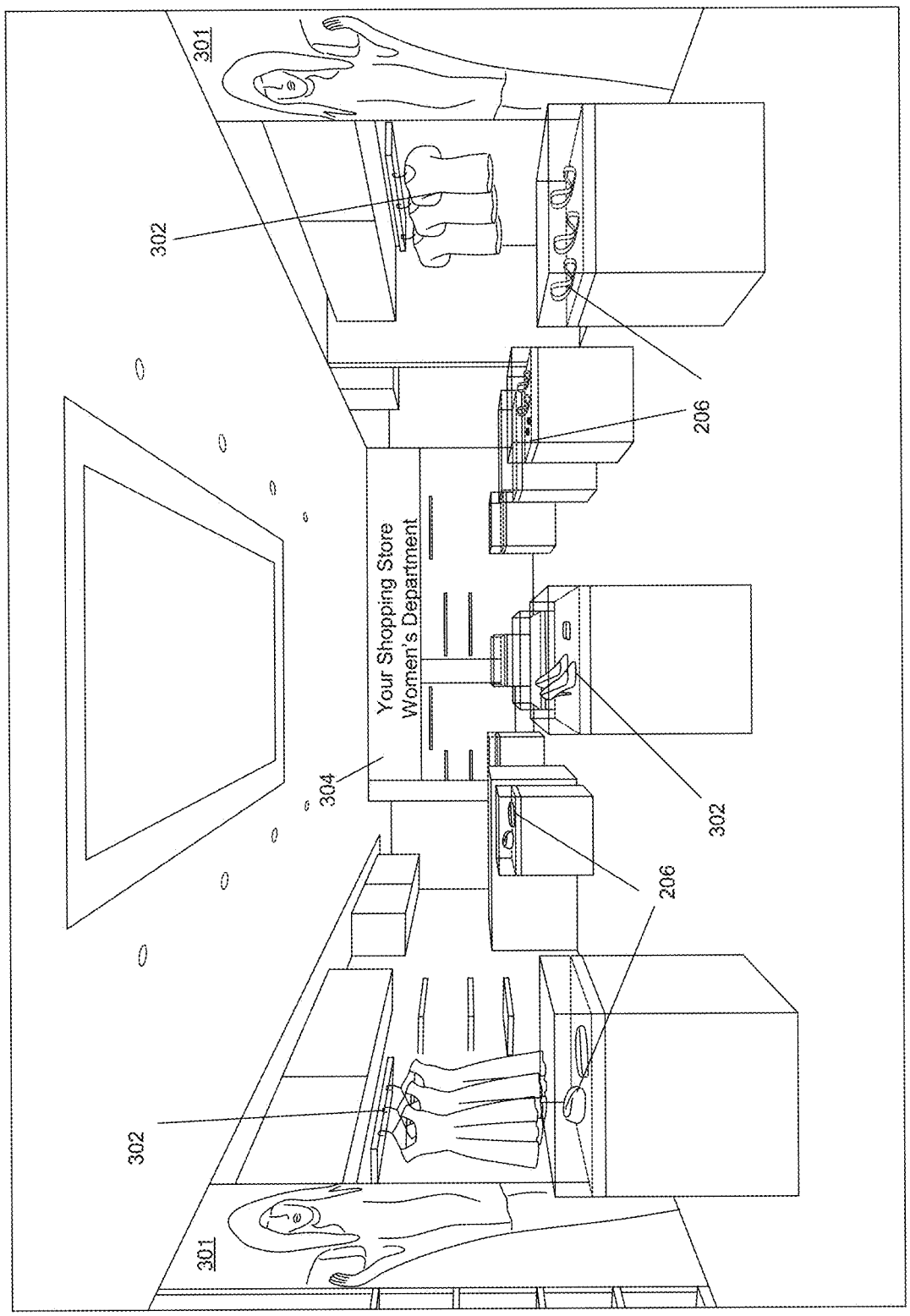
FIG. 3 illustrates a diagram describing another customized three dimensional geospatial setting according to one embodiment of the present invention.

FIG. 3 illustrates a diagram 300 describing a dynamically customized three dimensional geospatial setting according to one embodiment of the present invention. In one embodiment, the merchant can specify placeholders where dynamic content would be provided to the user. In one embodiment, dynamic content can include changes to the layout, advertisement/notification, and/or merchandize.

In one embodiment, system can, based on the user's actions, behaviors, and/or profile information, determine the user to be interested in women's clothing. If the user visits the same store as illustrated in FIG. 2, this user can be presented a customized rendition of the store, displaying women's merchandise. As illustrated in FIG. 3, advertisement 201 has been replaced with advertisement 301. Similarly, the men's department sign 204 has been replaced with women's department sign 304, and articles of clothing 202 have been replaced with feminine clothing 302. Also, static content/articles 206 of FIG. 2 can be seen in FIG. 3 as well. Thus, while two different users can visit the virtual store of the same merchant, both users can see a dynamically customized rendition of the geospatial setting based on their respective areas of interest.

Figure 4:
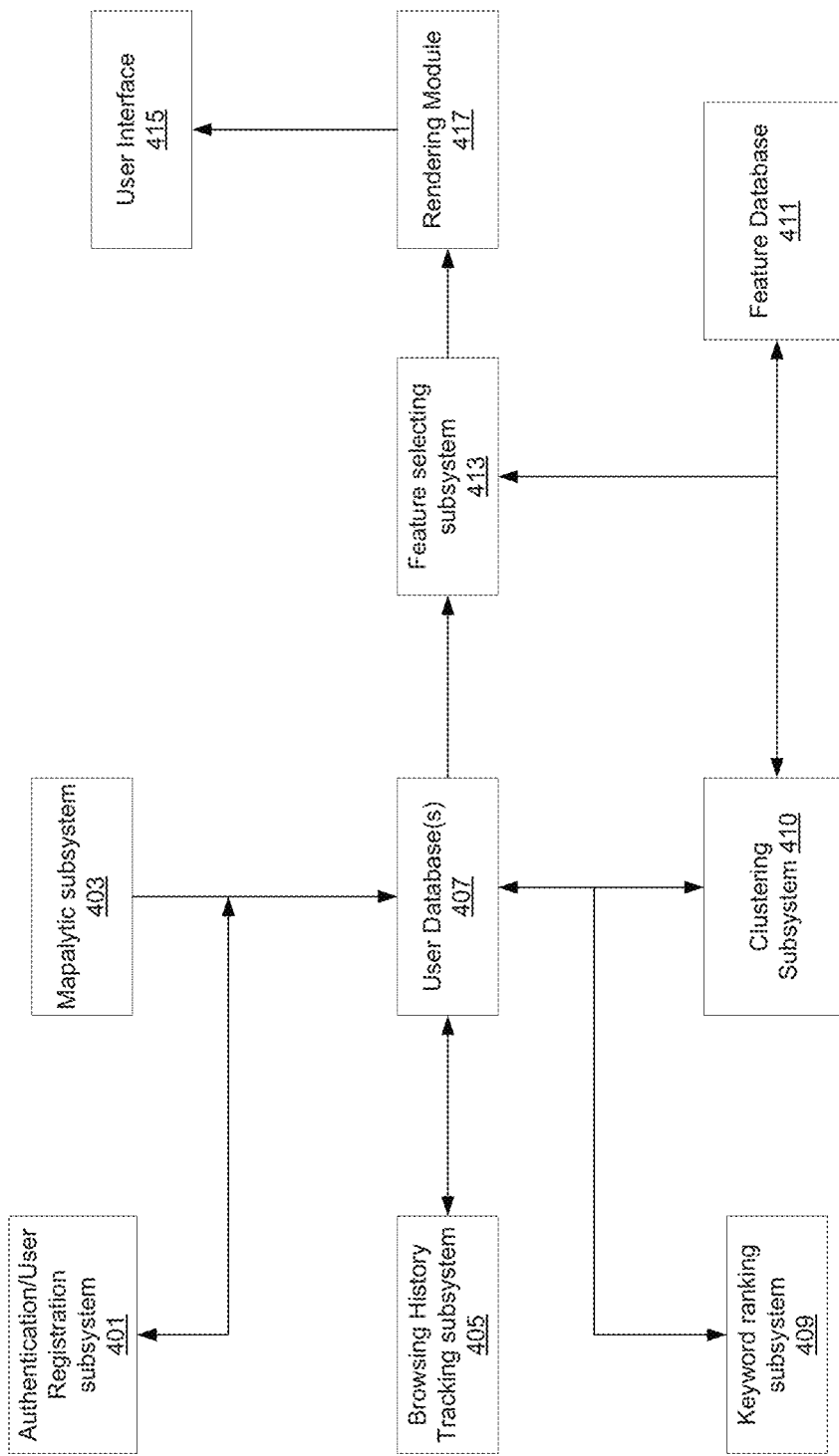
FIG. 4 illustrates a block diagram of its system architecture, according to one embodiment of the present invention.

FIG. 4 illustrates a block diagram of system 400 describing its system architecture, according to one embodiment of the present invention. As illustrated, system 400 includes authentication/user registration subsystem 401 that authenticates the user. The authentication module provides a mechanism to collect the user's credential and data, sends collected data in the form of a user profile that is stored in user database 407. Authentication subsystem presents the user for login credentials, queries the user database 407, and in general, grants access to the system and logs the user into the 3D virtual world. Authentication subsystem 401 is responsible to check if the user profile exists and is updated, and requires the user to provide credentials. The subsystem also includes mapalytics tracking subsystem 403 that can track and display mapalytics (heatmaps) related to users of the system. Mapalytics (map analytics) can be implemented to enable a user's access to heatmaps (e.g., pedestrian score, automobile score, bicyclist score, etc.,) that depict intensity and quality of specific features, such as restaurants, pedestrian access, topographic gradients, shopping, green-space, public transit, etc. Mapalytics tracking subsystem 403 tracks user gaze/direction transmits a rank (H) to the ranking algorithm which is described further herein. In one embodiment, mapalytics tracking subsystem 403 keeps track of where users of the system are mostly focuses/paying attention and promotes such features within the system. The subsystem 403 can check if users are in the proximity to some feature, gather screen center position, intersect user gaze direction with scene, and when a candidate feature to be promoted is detected, it increases the rank (H) for that feature.

System 400, in one embodiment, can include Browsing History Tracking Subsystem 405 that can track the user's browsing history within the 3D point cloud data. Browsing History Tracking Subsystem 405 can track's user most viewed features and features which the user has interacted with, and stores the feature related information (e.g., feature vectors) in a user area of interest storage space within user database 407. The Browsing History Tracking Subsystem 405, in one embodiment, checks if the user is logged in the system and retrieves user's position in the virtual world. Once logged in, the system enters in a cycle where it constantly evaluates user's proximity to a feature. Proximity, as described herein, refers to a spatial distance. In one embodiment, proximity is defined as the geometric distance (e.g., 5 feet, 10 feet, 15 feet, etc.) between a certain feature and the user.

When the user gets close to a feature and spends time around it, the system, in one embodiment, is configured to place that feature in the user's browsing history and becomes part of the definition of user's area of interest. In one embodiment, a user's area of interest can be represented as a parameter that tracks user actions and includes a list of feature vectors related to the successful trigger event, as described herein.

A user action can be any interaction with the active user interface (UI) features in the 3D digital environment. In one embodiment, system 400 includes keyword ranking subsystem 409 that includes a key logger and hot-keyword mapper. The keyword ranking subsystem 409 can continuously register user's typed words, apply filters and store filtered data into a database (user's dictionary) that is used to sort the most frequently used words used by the user and to calculate a keyword rank. This subsystem, in one embodiment, can store every keyword in a buffer in a Random Access Memory (RAM) sized as defined by threshold K (e.g., 500 words). Every additional word typed by a user is appended at the bottom of the list. In one embodiment a First-In-First-Out configuration can be applied while storing the keywords in the buffer.

Subsystem 409 can elaborate the last threshold K words (e.g., 500 words) detected and remove unimportant words and characters, including white spaces, punctuation and dead words (according to known system stored dead words dictionary). In one embodiment, the dead words can be extensive and stores all words that are not nouns, verbs, adjectives and names. This subsystem can assign a frequency score to each keyword inputted by the user and store/sort the words in user database 407 accordingly. This subsystem is also responsible, in one embodiment, to control the size of the user's keyword dictionary. For example, if subsystem 409 detects the length of the user's dictionary larger than a system defined threshold, subsystem 409 can delete words with least frequency score for words above the system defined threshold.

As mentioned above, Subsystem 409 also includes a hot keyword mapper. In one embodiment, hot keyword mapper represents a cycle that can trigger on the initiation or trigger of an events (e.g. user purchase, click on pop-up, etc.) and can register all recent keywords within a certain threshold defined by the administrator (e.g. 100 words) and increase the hot word factor in user's dictionary. This cycle can provide the system an overall analytics on the most used words in a purchase context that can be useful for purchase forecasting and thereby assist merchants with placement of features. In one embodiment, this cycle can check for a trigger event, and on its occurrence allocate every keyword in the buffer to a different area of RAM space sized as defined by threshold M, set by the administrator (e.g., 100 words). The cycle can then apply a frequency score and save corresponding information to User database 407. Keyword ranking subsystem 409 can also in one embodiment, sorts features and submit instructions about the priority of a feature to be rendered for a user. Such instructions can include a list of features, related 3D models, meshes, and textures. In one embodiment, clustering subsystem 410 can be implemented to determine areas of interest, as further described herein in FIG. 12.

System 400, in one embodiment, includes a feature database 411. Feature database 411 can include storing a feature vector, which is a tree structure that identifies a unique feature rendered in the point cloud data. A virtual position of a user or feature can be identified (and stored) as a vector composed of at least three floating numbers (x, y, z) that indicate the position of the user or feature within the reference coordinate system of the 3D virtual world. System 400 can also include a feature selecting subsystem 413 can interact with geo-visualization dataset 411 and user database 407 to determine the appropriate features to be transmitted to rendering module 417. Rendering module 417 then displays the selected features to the user via user interface 415. In one embodiment, rendering subsystem (module) can manage the composition and render of the 3D scene. A set of geometries related with the virtual position of the user is transmitted to the render engine along with specific options set by the user (e.g., resolution, anti-aliasing, texture resolution, lighting, etc.). In one embodiment, rendering module can transmit instructions to the graphical processing unit (GPU) in order to produce the frames that are streamed to user interface 415. The rendering module, in one embodiment, can logically operate on a lower layer dedicated to the 3D scene (keeping track of the information received from user database 407), while transmitting a top layer to user interface 415 that is visible to the user. Prior to transmitting the data to user interface 415, a layer manager composites the frame by merging all layers.

Figure 5A:
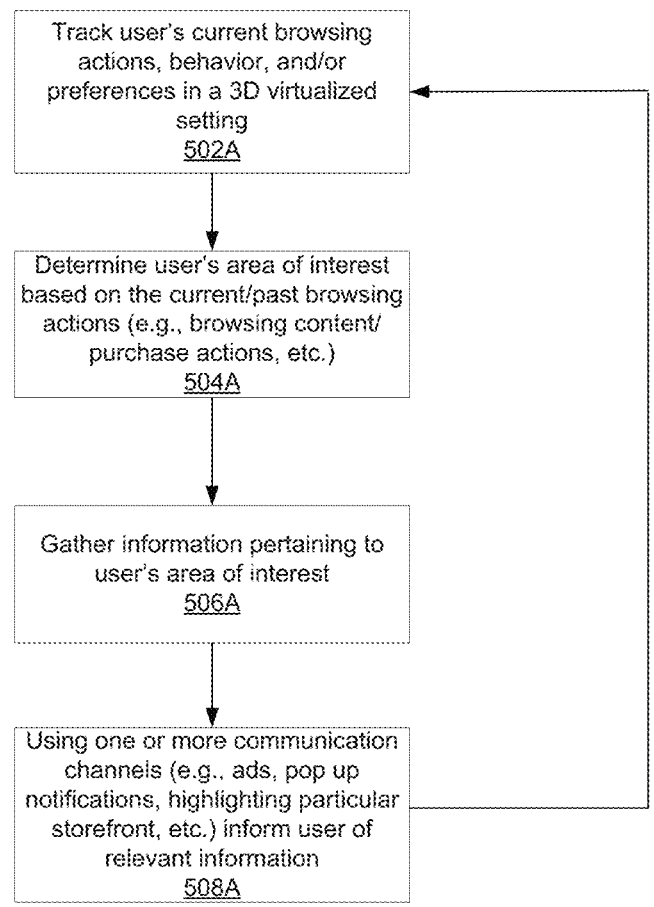
FIG. 5A illustrates a diagram of a flowchart describing a method to provide a user with relevant dynamically customized information using various communication channels according to one embodiment of the present invention.

FIG. 5A illustrates a diagram of a flowchart 500A describing a method to provide a user with relevant dynamically customized information using various communication channels according to one embodiment of the present invention. As shown at 502A system 400, using the techniques described herein, can track the user's current browsing actions in a 3D geospatial (exterior and/or interior) setting. In one embodiment, at 504A, this information accompanied with the users previous browsing history, actions, behavior, and/or preferences can be combined to determine the user's current area of interest. In one embodiment the current area of interest is determined using a heuristic approach. In another embodiment, only the user's current browsing actions are used to determine the user's current area of interest. In yet another embodiment, a user's actions can include the browsing content, purchasing actions, clicks, etc. At 506A the system queries its database to determine content relevant to the user's area of interest. At 508A, using one or more communication channels, the system dynamically can use various communication channels (e.g., ads, pop up notifications, highlighting particular storefronts, secret gateways, etc.), to inform/guide the user to access the customized information. Using the channels of communication, the user is informed that the system has determined useful information pertaining to the user's areas of interest.

Figure 5B:
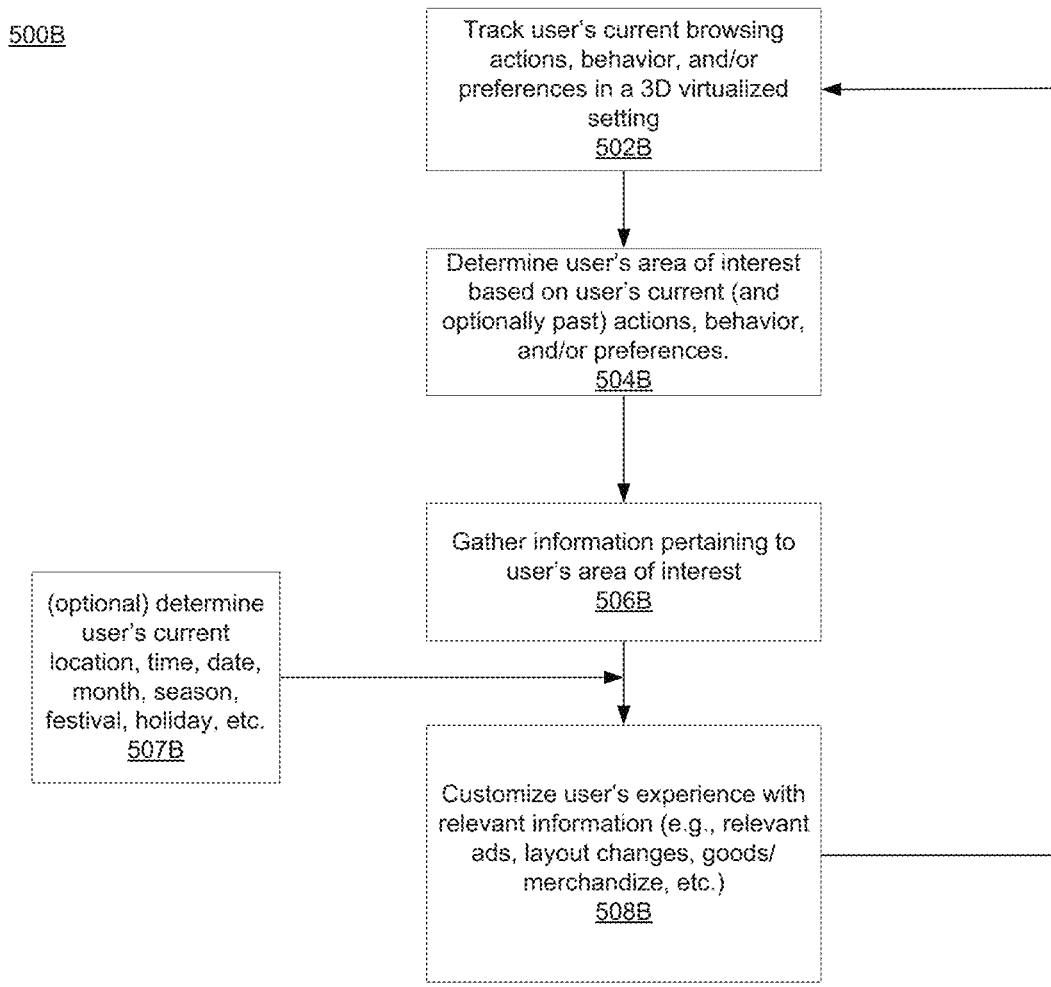
FIG. 5B illustrates a diagram of a flowchart describing a method to dynamically customize a three dimensional geospatial setting for a user, according to one embodiment of the present invention.

FIG. 5B illustrates a diagram of a flowchart 500B describing a method to dynamically customize a three dimensional geospatial setting for a user, according to one embodiment of the present invention. As illustrated at 502B, a system implementing the techniques described herein tracks user's current browsing actions, behavior, and/or preferences in a 3D virtualized setting. At 504B the system determines the user's area of interest based on the user's current (and optionally past) actions behavior, and/or preferences. At 506B the system gathers information pertaining to the user's area of interest. At 508B the system dynamically creates a customized user experience with relevant information (e.g., relevant ads, layout changes, goods/merchandise, etc.) In one embodiment, as shown at 507B, the system can determine the user's current location, time, date, month, season, festival, holiday, etc., and use this information to determine useful and relevant content for the user at 508B. For example, the user can be browsing a department store, and based on the user's action, the system, in one embodiment, determines "shoes" as an area of interest based on the user's actions. The system can then search its repository, and prompt the user to go to the next shoe store. However, if it is summer, then the system will only display stores that carry summer shoes (sandals, flip-flops, etc.) based on their inventory. Similarly, advertisements displayed related to summer shoes can be customized and presented to the user.

Figure 6:
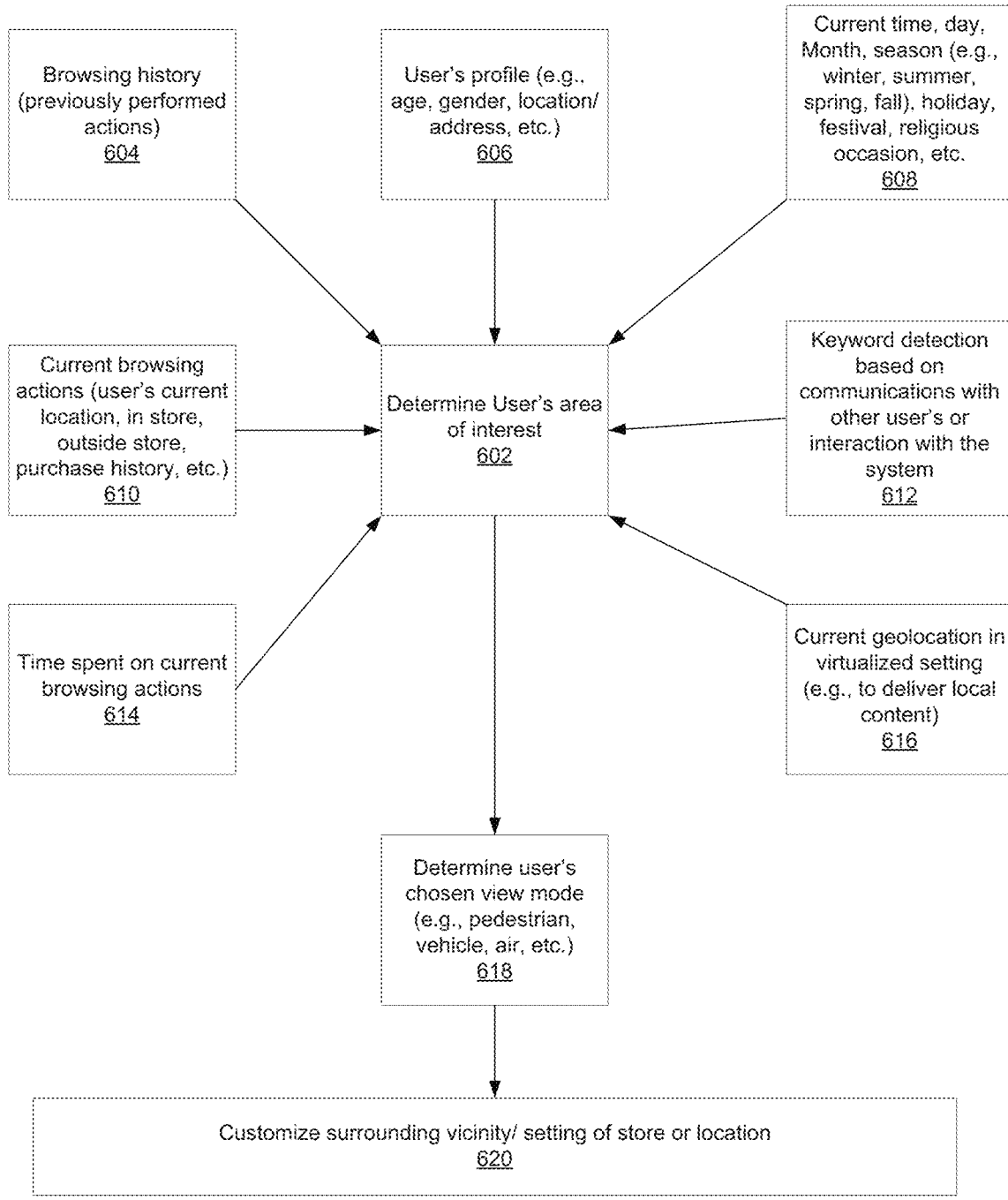
FIG. 6 illustrates a block diagram describing customizing a three dimensional geospatial setting based on a user's actions, behaviors, and/or preferences, according to one embodiment of the present invention.

FIG. 6 illustrates a block diagram 600 describing selecting a relevant dimensional geospatial setting based on a user's actions, behaviors, and/or preferences, according to one embodiment of the present invention. A user's behavior includes determining the time spent performing a certain action, and the action performed, depending on the current location (e.g., GPS coordinates) of the user in the virtual world, current date, time, etc. Other factors that can be included to determine a user's behavior include the current time, day, month, season, occasion, festival, holiday, etc. A user's preferences can be determined by user's profile information and can be further refined based on a user's repeated/frequent actions and behaviors. Thus, by combining the above, a heuristic approach can be employed to determine a user's area of interest and customize the geospatial settings accordingly, thereby providing the user an enhanced and/or interactive experience. In another embodiment, such customization techniques can also be employed to provide targeted advertisements, goods, merchandize, services, information, etc. to the user. Further, in one embodiment, the user is presented an opportunity to overlay individually-tailored information on the geospatial model based on the determined area of interest pertaining to the user.

In another embodiment, a system, using the techniques described herein, can be configured to change the interior or exterior settings depending on the time, date, month, national or religious holiday, etc. For example, street fairs or discount fairs, religious festivities, etc., can be created in the exterior or interior setting of an embodiment. In another embodiment, such settings can be customized based on each user's preference, browsing actions, behavior, etc., to provide each user a customizable experience.

Referring back to FIG. 6, various variables and factors can be used to determine the user's area of interest 602. In one embodiment the user's prior browsing history 604 can be tracked. The user's profile 606 can also be used to determine the user's preferences (using the user's demographics as an indicator). In another embodiment, the user's actions and/or behaviors coupled with the user's age can be used as to determine the user's area of interest. As shown at 608, in one embodiment the current time, day, month, season, holiday, festival, religious occasion, etc. can be taken into account. At block 610, the system can track the user's current browsing action as well. For example, the user's current location inside or outside a store setting can be used to display merchandise in a store, or outside in a fair. Thus, in one embodiment, in a fair setting, only merchandise that is related (and customary) to fairs can be displayed. As shown at 612, keyword detection based on communications with other users or interaction with the system can also be used to determine the user's area of interest. In another embodiment, as shown at 614, the time spent on the user's browsing actions or behaviors can be also taken into account to determine our user's current area of interest. Also, as shown at 616, the user's current geographical location in the virtualized setting can also be taken into account to display locally-manufactured goods to support the local economy.

Once the current area of interest has been determined, in one embodiment, the system can determine or consider the user's chosen view mode, for example, pedestrian view, vehicle view, air view, etc. to customize the surrounding vicinity of a setting. Thus, if the user is currently viewing the system in automobile view, advertisements that may be suitable in a pedestrian view may not be displayed, or can be configured (e.g., bigger font) to be suitable to be viewed mode. Also, certain goods that pertain to pedestrians (e.g., public transit passes) may not be displayed to the user.

Figure 7:
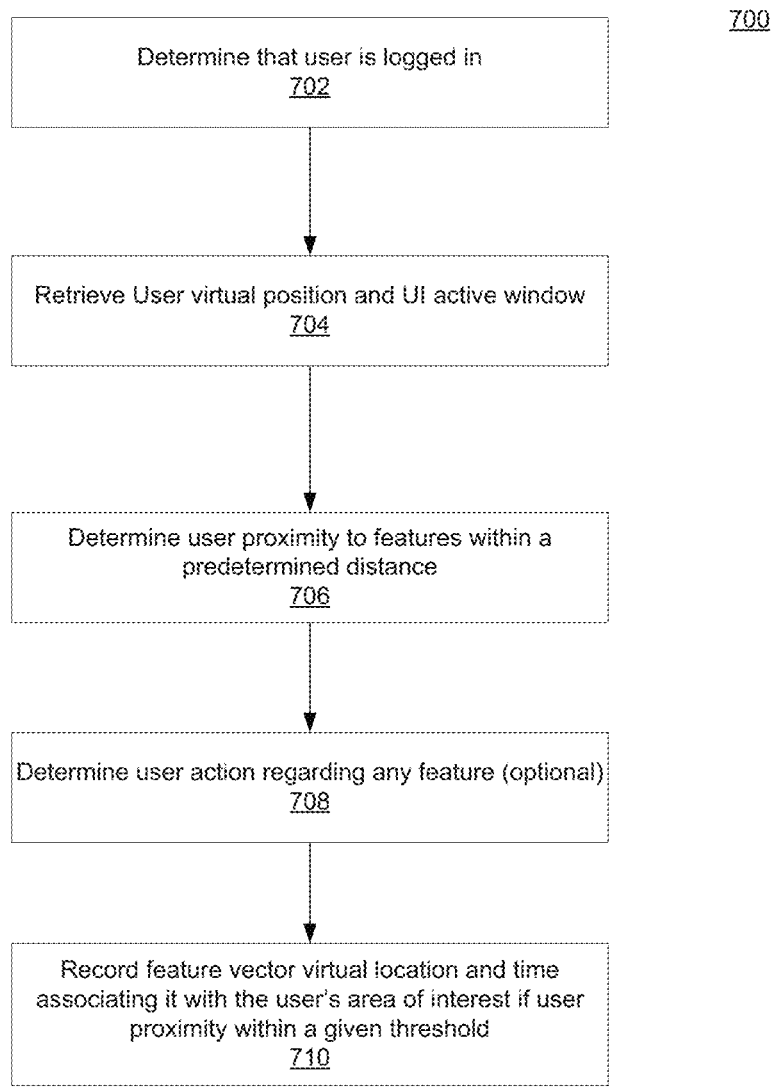
FIG. 7 illustrates diagram of a flow chart describing the recording of features associated with a user's area of interest, according to one embodiment of the present invention.

FIG. 7 illustrates diagram 700 of a flow chart describing the recording of features associated with a user's area of interest based on the user's browsing history, according to one embodiment of the present invention. At 702 the system determines whether the user is logged in At 704 the user's current virtual position and active user interface window is determined. The active user interface window is defined as the window in the graphic user interface that is currently handling user's interaction. At 706 the system determines the user's proximity to features within a predetermined distance, as discussed herein. Optionally, at 708 the system determines user action regarding any feature within the 3D scene. At 710, the system records the feature vector's virtual location and the time associated with the user's browsing history, if the user is in proximity with the feature. As discussed above, the information can be saved in user database 407.

Figure 8:
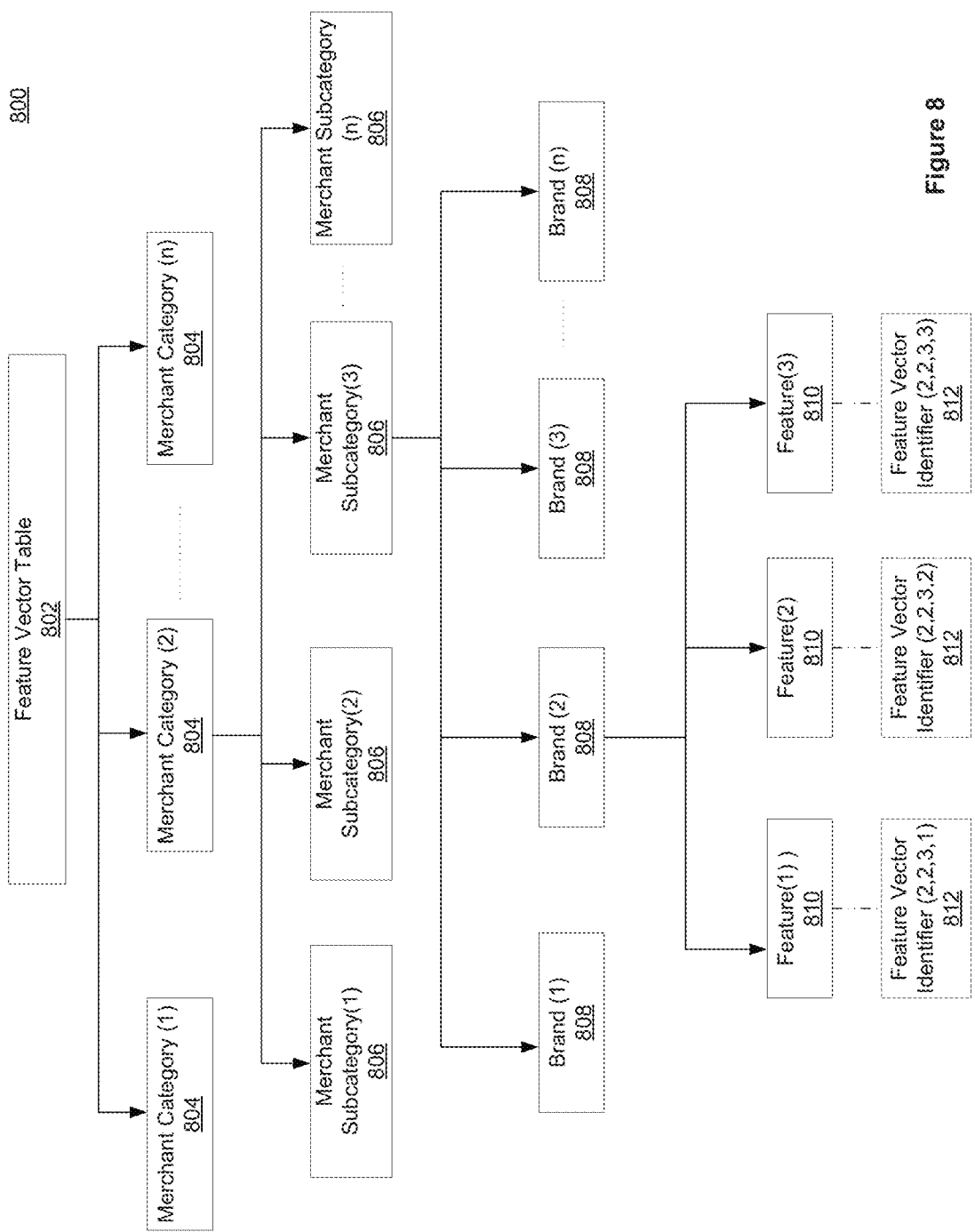
FIG. 8 illustrates a block diagram of a feature vector, according to one embodiment of the present invention.

FIG. 8 illustrates a block diagram 800 describing a feature vector, according to one embodiment of the present invention. As illustrated, feature table 802 can include data elements describing a tree structure that can uniquely identify a feature by providing four dimensional unique identifying key. Feature table 802 can include one or more merchant categories identifiers 804. Each merchant category 804 can further include one or more subcategories identifiers 806. A merchant subcategory identifiers 806 can include one or more brand identifiers 808 and each brand identifier 808 can include one or more feature identifiers 810. Each feature vector, can thus be represented by the tree structure with a reference identifier 812, as described by tree structure 800. In one embodiment, the vector can be identified as a four dimensional identifier key representing the feature comprising the merchant category identifier, subcategory identifier, brand identifier, and feature identifier as illustrated by feature vector identifier 812. Therefore, in such a manner feature vector can identifies the branch and the position of a feature in the tree. In one embodiment, the tree can comprise four hierarchic levels as illustrated, where the first level is split up between many providers (e.g. clothes online stores) and the lower defines the feature category (e.g. male sportswear), brand (e.g. Nike) and eventually product (e.g. running shoes). Each sub-category is represented by an integer number in the feature vector. One of ordinary skill in the art would appreciate that a feature vector as described herein can be identified by multiple levels (thus having a key identified by more than four identifiers).

Figure 9A:
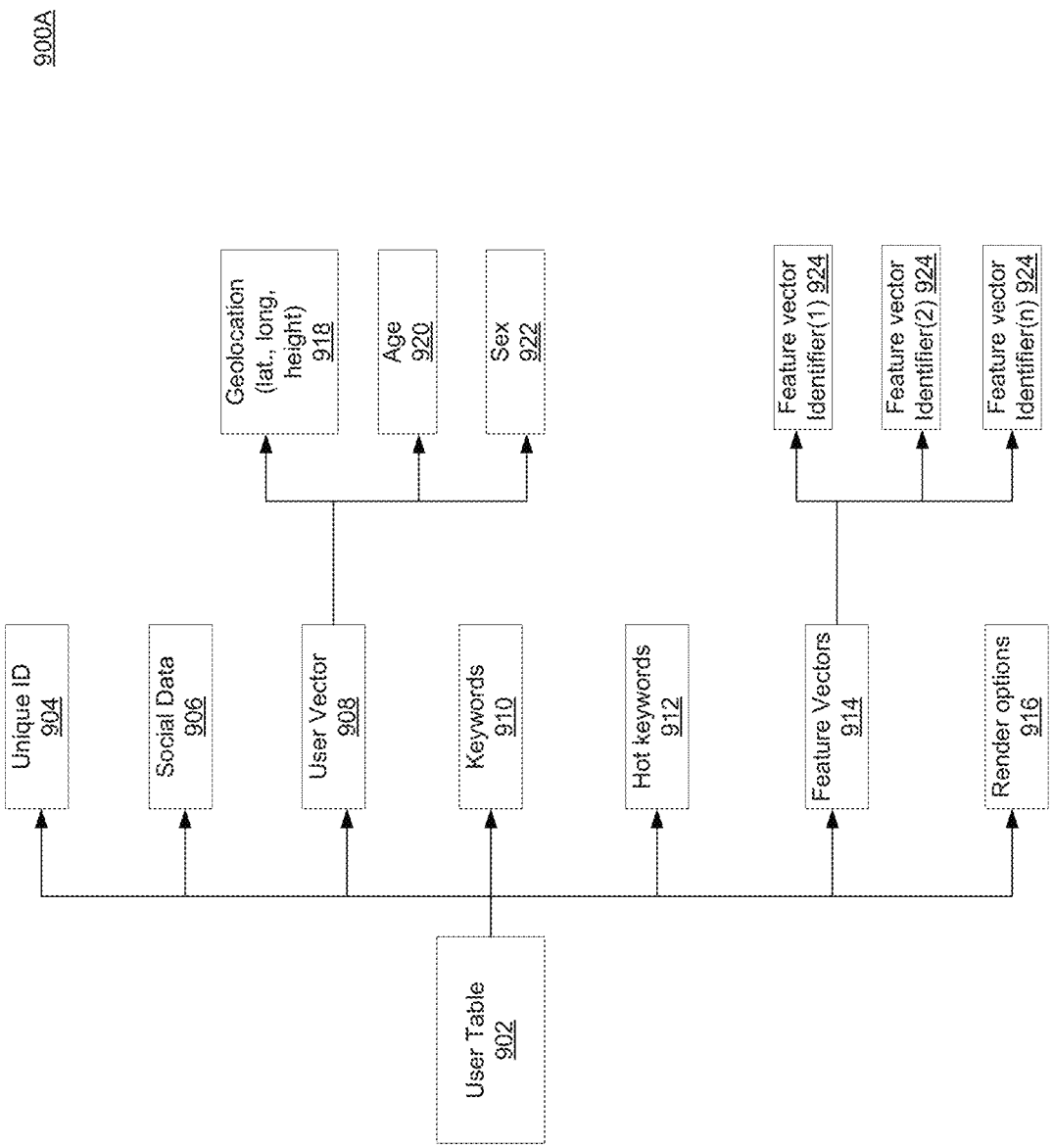
FIG. 9A illustrates a block diagram of a user table, according to one embodiment of the present invention.

FIG. 9A illustrates a block diagram 900A of data table to store user's data according to one embodiment of the present invention. As illustrated user database 902 can store information pertaining to a user having a unique ID 904. The user database can include social data 906 pertaining to the user, user vector 908, keywords 910, hot keywords 912, feature vectors 914 and other rendering options 916. In one embodiment, user vector 908 is stored in user database 407 and is used by a user clustering algorithm described further here. User vector 908 can include geographical location 918, age of the user 920, and gender of the user 922. User database 902 can also store feature vectors identifiers 924 that correspond to data feature vector 810. Such feature vectors identifiers 924 can represent the features recorded at 710 as explained while describing FIG. 7. In one embodiment, geographical location 918 is periodically updated with the user's current location, and feature vector identifiers 924 store the feature vectors with which the user was in close proximity, resulted in a trigger event, resulted in completion of a trigger event, or a combination thereof (as discussed herein).

Figure 9B:
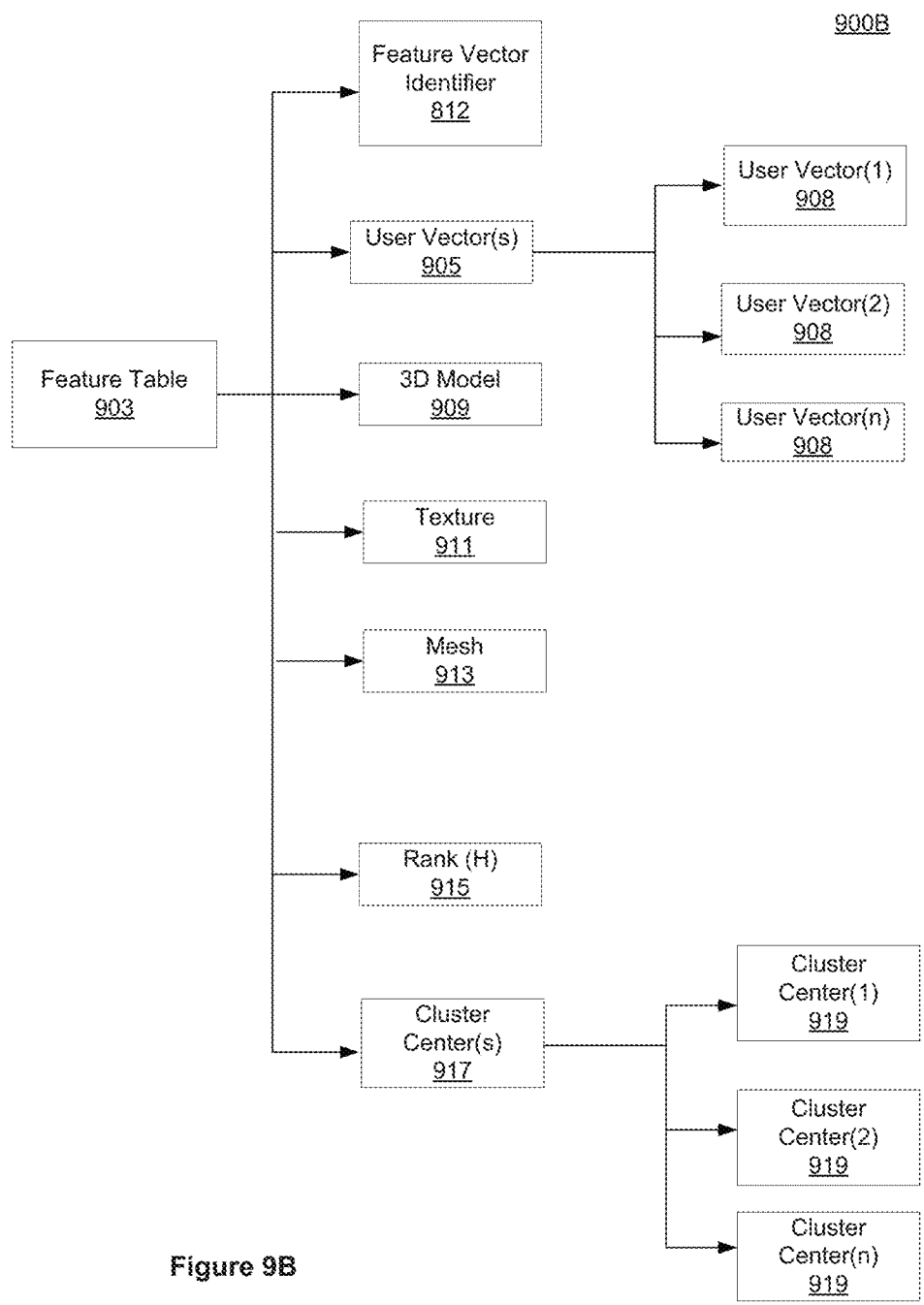
FIG. 9B illustrates a block diagram of a feature table, according to one embodiment of the present invention.

FIG. 9B illustrates a block diagram 900B of data table to store features according to one embodiment of the present invention. As illustrated, feature table 903, in one embodiment, can include feature vector identifier 812 that references to a specific feature in the feature table that is rendered to the user interface 415. Feature table 903 comprises a plurality of feature data. In one embodiment, feature data can include a list of user vectors 905. The list of user vectors 905 includes user vectors 908, as illustrated in FIG. 9A. Feature table 903, in one embodiment, can also include 3D model 909 for feature, texture parameters 911 and mesh configuration 913 for each feature. Feature table 903 can also include a rank 915 for each feature, wherein the rank is calculated as discussed herein. Feature table 903 can, in another embodiment, include a list of cluster center positions 917 that corresponds to cluster center positions 919 corresponding to each user vector 905 stored in table 903. In one embodiment, cluster point position data 919 includes user vector 905 data and is populated by clustering subsystem 410 as discussed further herein in FIG. 12.

It should be noted, throughout this document, a table refers to a logical database table and can include a relational or non-relational join(s) of multiple physical tables or files. Similarly, a person or ordinary skill in the art would appreciate that the invention is not limited to any particular database model and can be implemented on relational databases (e.g., SQL based databases), non-relational databases (e.g., NoSQL based databases), or a combination thereof.

Figure 10:
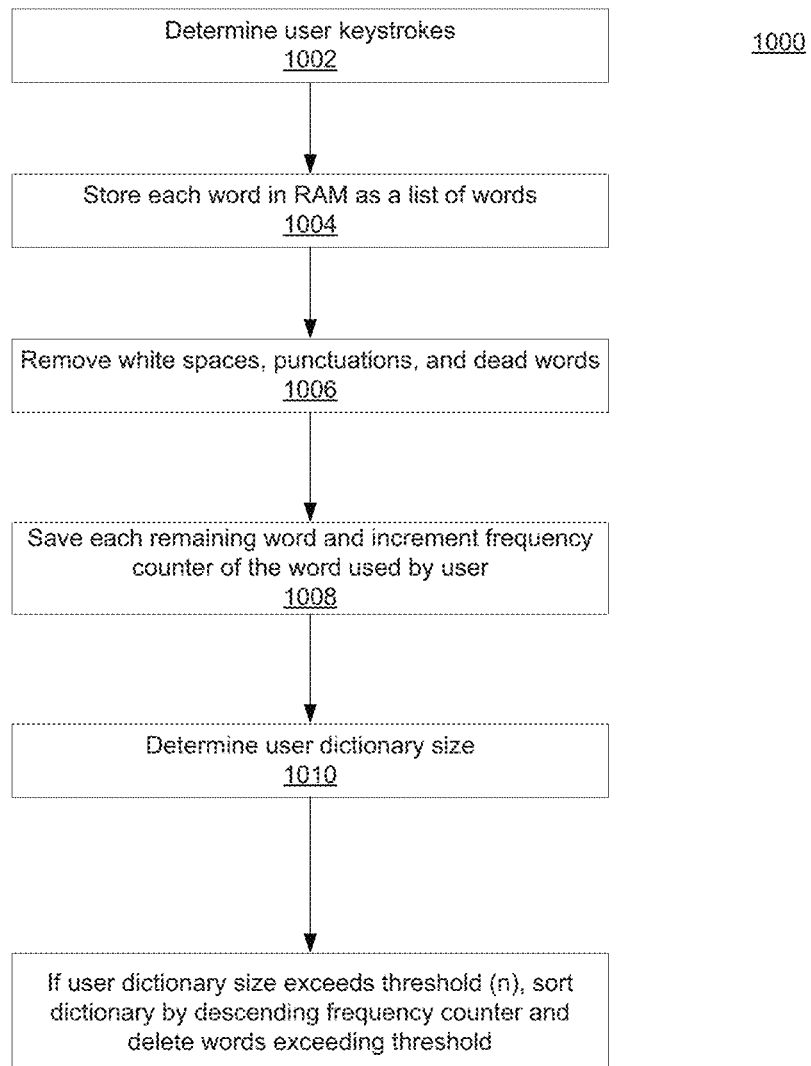
FIG. 10 illustrates a block diagram describing a key logging subsystem, according to one embodiment of the present invention

FIG. 10 illustrates a block diagram 1000 describing a key logging cycle of key ranking subsystem 409, according to one embodiment of the present invention. As illustrated, at 1002 subsystem 409 determines the user's keystrokes. At 1004 each word entered by the user is stored in RAM as a list of words. At 1006, white spaces, punctuations, and dead words are removed. At 1008, the remaining words are saved to the user's data record in user database 407, and a keyword frequency score is added to each keyword. In one embodiment, the keyword frequency score is an incremental counter that increments an integer value based on the number of times a certain keyword is used by the user. In one embodiment, as illustrated at 1010, subsystem 409 can determine the user's dictionary size (preset by system configuration), and if the user dictionary size exceeds the present dictionary size threshold, subsystem 409 can short the dictionary by frequency score (in descending order), and delete the words that exceed the threshold size.

Figure 11:
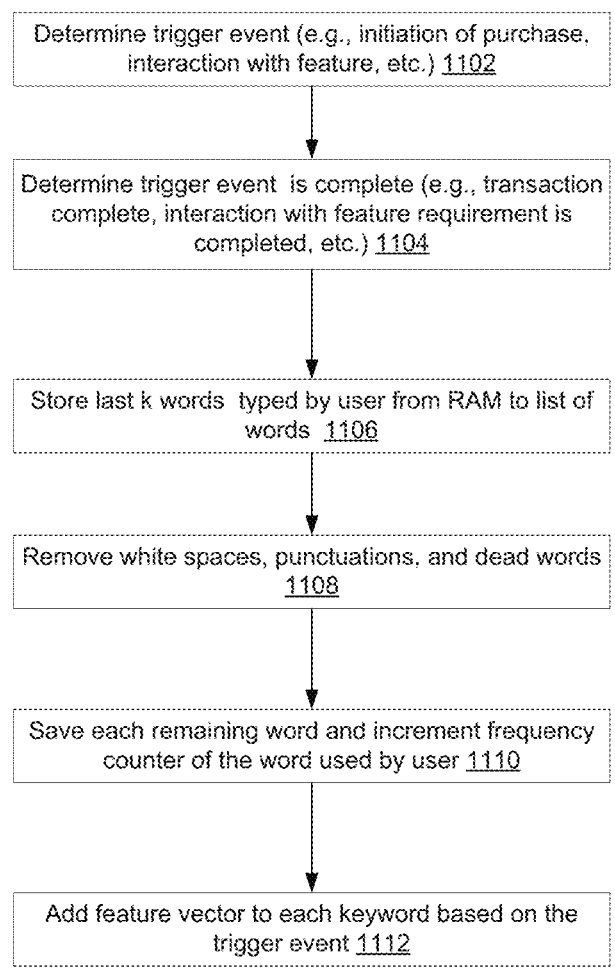
FIG. 11 illustrates a diagram of a flow chart describing a hot keyword mapping subsystem associated with a user's area of interest, according to one embodiment of the present invention.

FIG. 11 illustrates a diagram 1100 of a flow chart describing a hot keyword mapping of subsystem 409 that can determine a user's area of interest, according to one embodiment of the present invention. At 1102 the subsystem can determined trigger events (e.g., initiation of a purchase transaction, user interaction with a feature, etc.). At 1104 it is determined that the trigger event is completed (e.g., completion of a transaction or feature requirement, etc.). A completion of a feature requirement, in one embodiment, can be clicking on a feature or performing a certain action (as interacting with a feature for more than a threshold time (e.g., 1, 5, 10 seconds, etc.). In one embodiment, a completion of a feature requirement would be clicking on a video associated with a feature, asking a question, sharing a link of the feature on social media, or any action that is generally related to the feature.

Once it is determined that the trigger event requirement has been completed, at 1106, the subsystem can sore the last k words typed by the user (in RAM) to a list of potential hot keywords, that is, words that are considered important. At 1108, the subsystem can remove white spaces, punctuations, and dead words, and at 1110 each remaining word can be saved as a list of hot words used by the user long with a frequency score associated with the word. In one embodiment, the hot keyword frequency score is an incremental counter that increments an integer value based on the number of times a certain keyword is used by the user. At 1112 the feature vector is associated with the hot keyword and saved in the data space associated with the user in user database 407.

Figure 12:
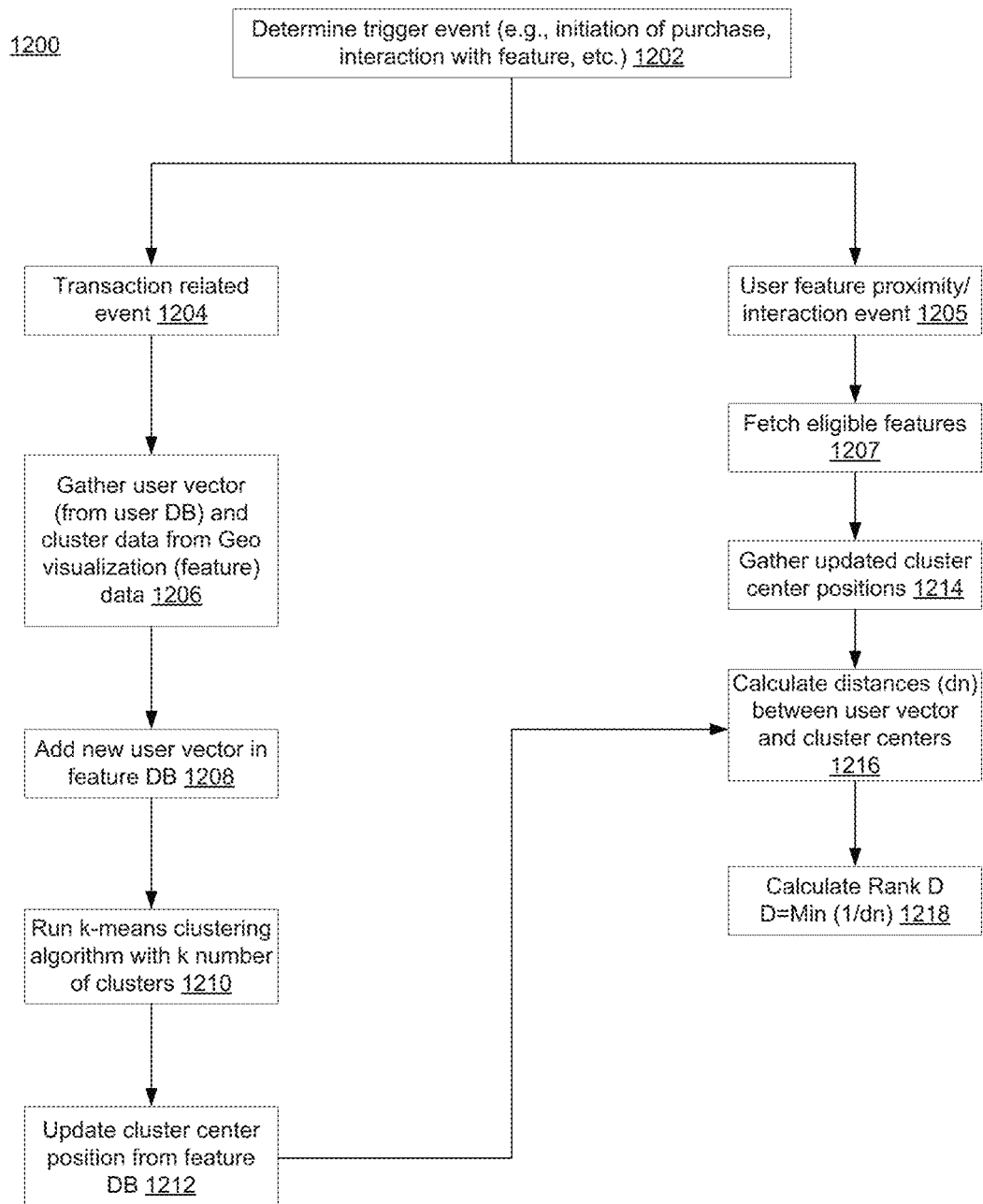
FIG. 12 illustrates a diagram of a flowchart describing a user area of interest clustering process, according to one embodiment of the present invention.

FIG. 12 illustrates a diagram 1200 of a flowchart to rank a user's area of interest using a clustering process, according to one embodiment of the present invention. As disclosed above, the clustering subsystem 409, in one embodiment, can perform a clustering process to rank a user's area of interest. Therefore, in one embodiment, clustering subsystem 410 allows the system to learn from user's choices and action and classifies users (user vectors) in clusters. At initiation of a trigger event, a new user vector may affect cluster composition. User vector are compared to other cluster through a distance parameter (dn) to find the closest cluster to a given user. User-cluster distance is a parameter of ranking (D). As illustrated at 1202 the trigger event is determined, and it is checked if the event was a user purchase related event, at 1204. At 1206, the user's vector is fetched from the user's database. The user vector, in one embodiment, can be a set of data that identifies the user and is represented as textual data as numbers (age[1-99], gender [0-1], geographical location [long., lat., height]). Thereafter, at 1208, the current user vector 908 is added to the feature database as a cluster point. In one embodiment, the feature database stores data about all the users that purchased or starred a given feature. At 1210, the process runs a k-means clustering algorithm with K number of clusters. In a K-means clustering algorithm, feature-user vectors and number of clusters (K) are given as inputs, where the K-means subdivides the user vectors in K number of clusters and provide center coordinates. As a non-limiting example, if the user vector is provide as 5-dimensional space of age, gender, x-coordinates, y-coordinates, and z-coordinates (where x, y, and z coordinates represent the user's geographical location in the 3D point cloud data), then the K means algorithm would provide center coordinates [age, gender, x, y, z] for each of the k-th cluster. The cluster center coordinates are then updated from the feature database at 1212. Thereafter control is transferred to 1216 where the distance between the user vector and the cluster centers are calculated. At 1218, the rank for the selected feature is calculated, the rank being based on the shortest distance between the user vector and the cluster center. If however at 1205, it is determined that the trigger event included an interaction or proximity with a feature, then at 1207, eligible features are fetched, and at 1204 the updated cluster center points for the features are gathered from the database. Control then passes on to 1214 to calculate the rank of the given feature. Once the clustering process is complete, the rank of a given feature is then stored in the feature database.

Figure 13:
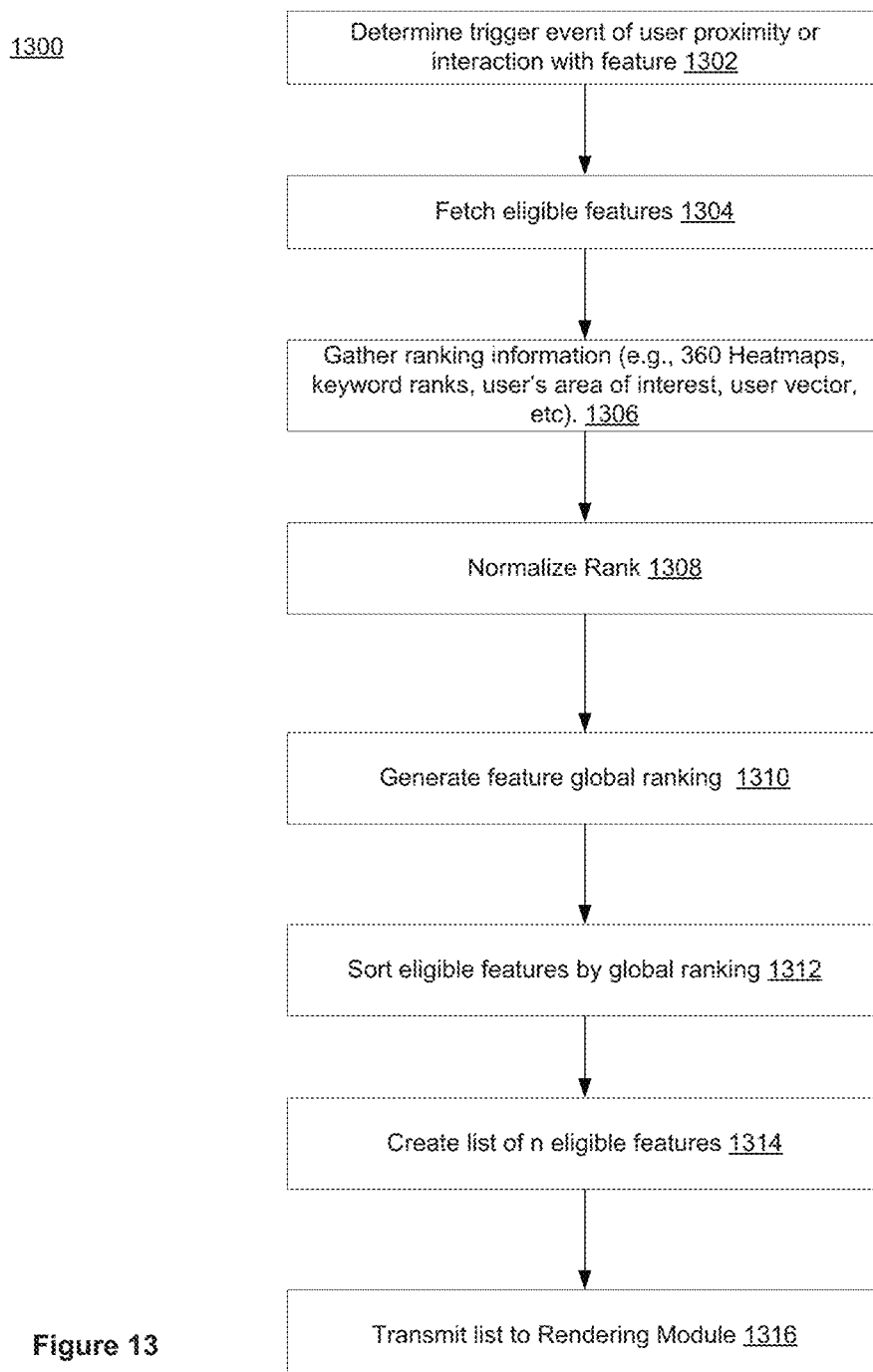
FIG. 13 illustrates a diagram of a flowchart describing a feature selection and ranking process according to one embodiment of the present invention.

FIG. 13 illustrates a diagram 1300 of a flowchart describing a ranking process according to one embodiment of the present invention. In one embodiment, the ranking process is implemented by feature selection subsystem 413. As illustrated, at 1302, it is determined if an event trigger is initiated, as disclosed herein. The trigger event determination can be implemented as a cycle that constantly checks for the trigger events. In one embodiment, a trigger event can be determined when the user gets close to a hotspot (e.g. a pedestal, a shop or an advertisement space) that has been previously defined by the administrator or a virtual space owner provider (e.g. the owner of a virtual shop). In one embodiment, the trigger is initiated when the distance between the user and the hotspot reaches below a threshold (t) set by the system administrator (e.g. 15 feet). At 1304, eligible features are fetched from the feature database. Eligible features can be any feature which is directly or indirectly related to the trigger event. In one embodiment, as the trigger is activated, feature selecting subsystem 413, gathers all eligible features that are configured by the administrator or the virtual space owner (e.g. all the products of a virtual shop) and stores the features in the RAM. 1306, the ranking information of all eligible features from various sources (e.g., user data table, feature data table, etc.), are gathered for further computation. The ranking information, in one embodiment, includes mapalytics (heat-map) information, keyword ranking, hot word ranking, user vector information, clustering points, etc. In yet another embodiment, gathering the ranking information can include, the user's clusters distance as determined by clustering subsystem 410, user's mapalytics data, user's dictionary database including the determined keywords and hot keywords, similarity with similar keywords, hot words used by other users, etc. At 1308, the ranks are normalized from each source. In one embodiment, a normalized rank can be float (decimal) number that is scaled to range between 0 to 1. As a non-limiting example, by evaluating a multitude of data a similarity between multiple user's area of interests can be determined and defined by the overlaps of preferred features vectors in users' hot keyword history. The overlap threshold is a parameter defined by user match percentage can be calculated amongst multiple users. In one embodiment, a threshold of similarity matches between 25-45% of overlaps of hot keywords for a given feature vectors can be considered as a threshold. Hot keywords belonging to users with similar area of interest are then used to calculate rank (k).

Similarly, a normalize rank for user's proximity/attention towards a feature can be calculated, as explained further herein. When a user walks in proximity of a feature hot spot, the system can, in one embodiment, record the position of user's gaze. The system can then find what is displayed in the middle of the screen relative to the user's current position, and if a feature intersects the coordinates of the middle of the screen, it can be presumed the user is looking at such feature. Thereafter, a frequency score of proximity to a feature can be determined if the user remains in proximity to (or interacts with) the feature. The rank can then, in one embodiment, be normalized as:

$$H_{i,norm} = H_i / H_{max}$$

where $H_{i,norm}$ is the normalized H rank for feature i-th, $H_i$ is the cumulative score for feature i-th, and $H_{max}$ is the overall maximum rank assigned, with the top fractal 5% disregarded.

A normalized rank (k) can also be assigned based on hot keywords typed by users with common area of interest and measure the probability of interest of a given feature (i) with respect to a user's past experience. The rank is higher when a word is not commonly used and has been associated with a purchase or a meaningful user action related to past experiences (or a set of users with common area of interest). In this case, the normalization factor (k) can be calculated by $$K_{norm,i,J} = \Sigma_{i,J}[(\log(1/\text{frequency}_{i,J}))*\text{positive feedback}_{i,J})]/K_{max,i,J}$$

where $K_{norm,i,J}$ is the normalized K score frequency$_J$ is the frequency which J-th keyword is detected for feature i-th, positive feedback$_J$ is the score assigned to keyword J-th for feature i-th, and max score$_{i,J}$ is the highest score assigned (top fractal 5% disregarded).

A normalized likelihood factor (D) can also be calculated that represents the likeness of a user towards a given feature. In one embodiment, the likelihood can include the distance between a user and a feature. In one embodiment, the likelihood factor can be represented as $$D_{norm,i,J} = (1/\min\{dn_{i,J,K}\})\max\{D_{norm,i,J}\}$$

where $D_{norm,i,J}$ is the normalized D rank, min $\{dn_{i,J,K}\}$ is the smaller distance of user i-th from cluster K-th in feature J-th and max $\{D_{norm,i,J}\}$ is the greatest D rank for user i-th and feature J-th.

At 1310 global feature ranking is computed using the normalized ranking factors. In one embodiment, the global ranking can be the sum of the normalized factors. At 1312 the features are sorted based on their global ranking which is based on a user's area of interest. At 1314 a list of feature information from the sorted features is created. At 1316 the list is transmitted to rendering module 417 from where the features displayed are presumed pertinent to the user (or are expected to be part of the user's area of interest).

Figure 14:
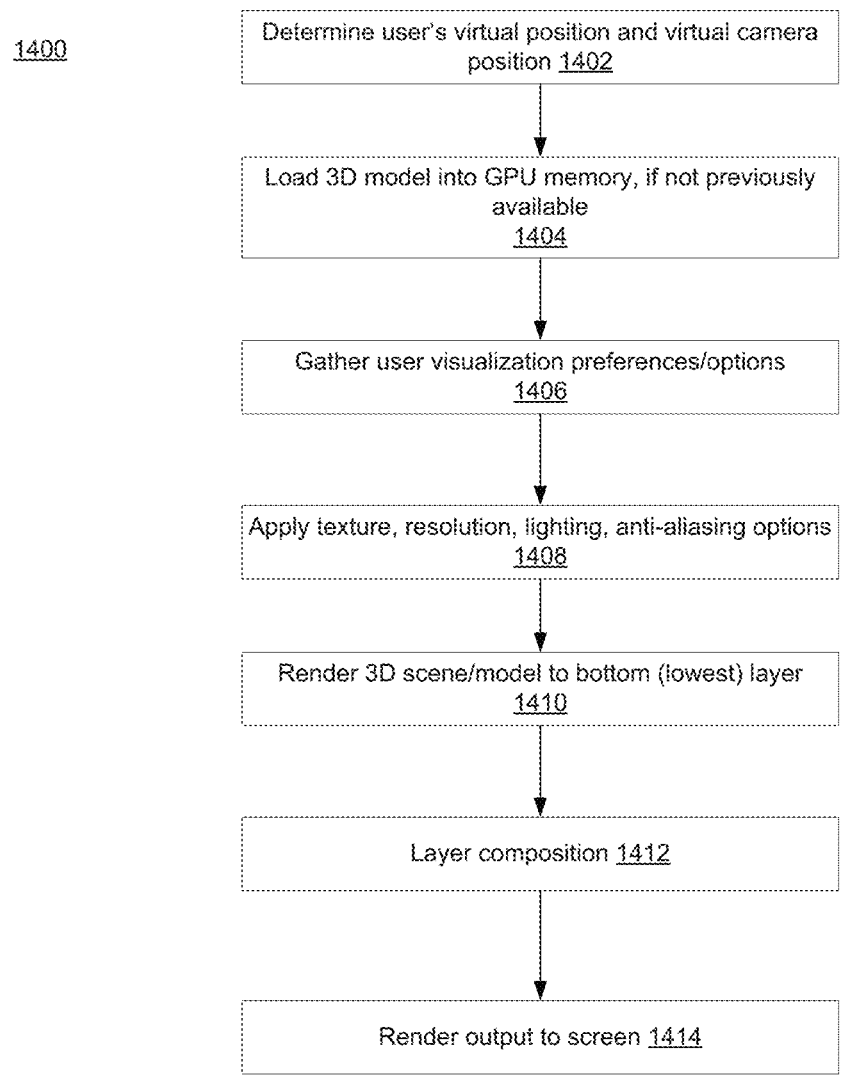
FIG. 14 illustrates a diagram of a flowchart of a feature rendering subsystem, according on one embodiment of the present invention.

FIG. 14 illustrates a diagram 1400 of a flowchart of a feature rendering subsystem, according on one embodiment of the present invention. In one embodiment, at 1402, initially, the user's virtual position and relative virtual camera position is determined. In one embodiment, if it is determined that the user has already logged in, then it is determined if the user has since changed their position. If so, the updated user virtual position is determined. At 1404 the 3D point cloud model is loaded into GPU memory. At 1406, the user's visualization preferences and options (e.g., profile data) is determined. At 1408, texture, resolution, lighting, and anti-aliasing options related to the 3D point cloud data are applied. At 1410, the 3D scene model is rendered from the bottom (lowest) layer. If it is determined that a feature is being pushed by feature selecting subsystem, the feature data is gathered and rendered on the top layer. At 1412, the layer composition techniques are applied, and at 1414 the output is rendered to user interface 415.

Figure 15:
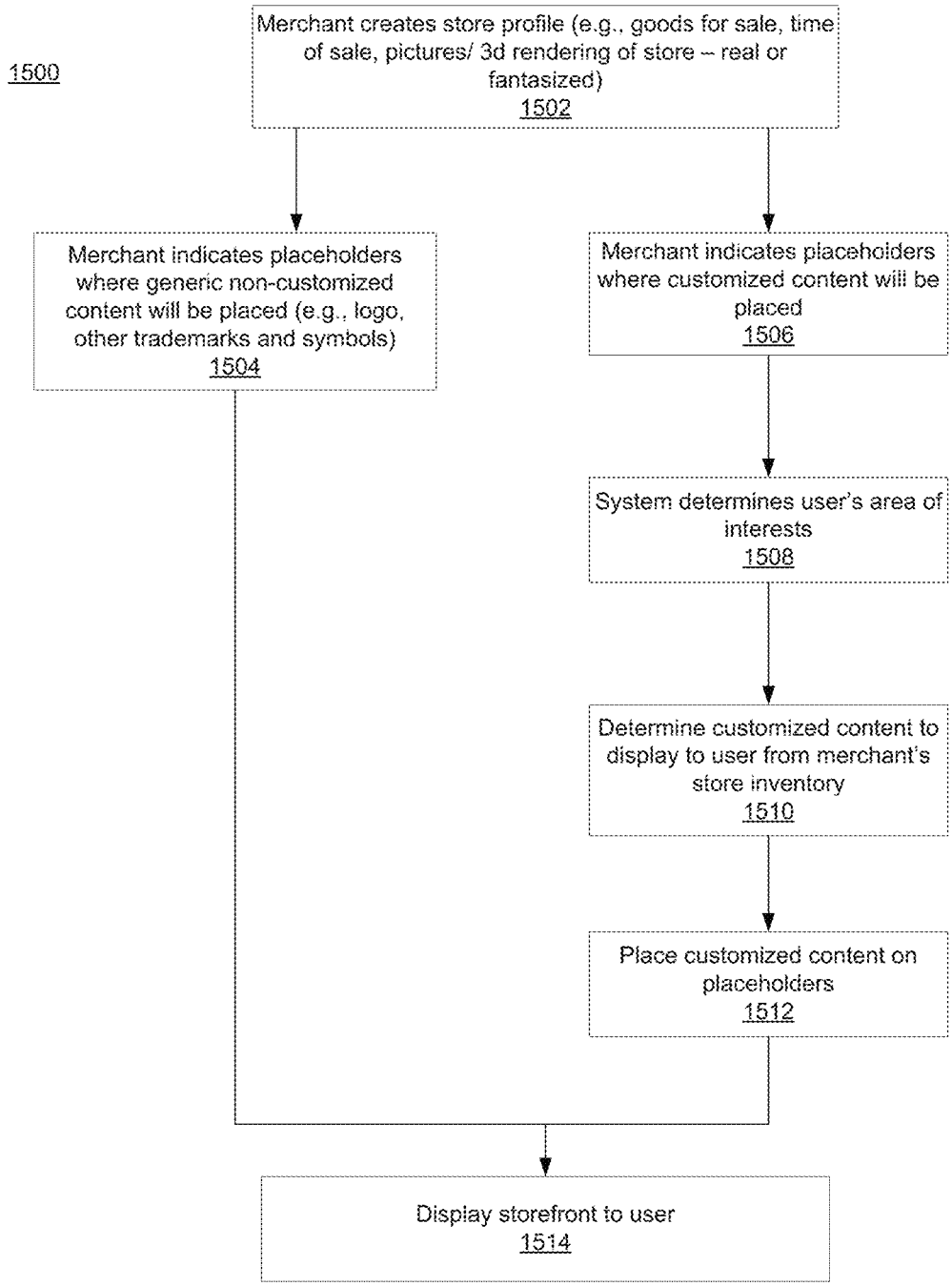
FIG. 15 illustrates a diagram of a flowchart describing a method to dynamically customize and display a merchant's storefront to a user, according to one embodiment of the present invention.

FIG. 15 illustrates a diagram of a flowchart 1500 describing a method to dynamically customize and display a merchant's place of business to a user, according to one embodiment of the present invention. At 1502, the merchant can create a place of business profile (e.g., goods for sale, services for sale, etc.) The user can also provide pictures and or 3D renderings of the place of business that they wish to be displayed to potential customers. In one embodiment, these places of business can be based on a realistic or fantasized rendering of the merchant's store. For example, stores that only have online presence (that is, with no traditional brick/mortar establishment), can be allowed to create a fantasized virtual place of business for their customers. At 1504, the merchant can indicate placeholders where non-customized (static) content (e.g., merchandise 206, etc.) will be placed, and at 1506 the merchant can indicate where customized content (e.g., merchandise 202, information 204, etc.) can placed. In another embodiment, the system is configured to automatically place non-customized and customized content. At 1508, the user's current area of interest is determined using any of the techniques described herein. At 1510, the system determines customized content to display to the user from the merchant's inventory. In one embodiment the store's inventory is searched using a heuristic approach. At 1512 the system places the customized content on the placeholders determined at 1506. At 1514 the customized place of business is displayed to the user as illustrated in FIGS. 2&3.

The techniques shown in the figures can be implemented using computer program instructions (computer code) and data stored and executed on one or more electronic systems (e.g., computer systems, etc.). Such electronic systems store and communicate (internally and/or with other electronic systems over a network) code and data using machine-readable media, such as machine-readable non-transitory storage media (e.g., magnetic disks; optical disks; random access memory; dynamic random access memory; read-only memory; flash memory devices; phase-change memory). In addition, such electronic systems typically include a set of one or more processors coupled to one or more other components, such as one or more storage devices, user input/output devices (e.g., a keyboard, a touchscreen, and/or a display), and network connections. The coupling of the set of processors and other components is typically through one or more buses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

It should be apparent from this description that aspects of the present invention may be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize that what is meant by such expressions is that the functions result from execution of the code by a processor.

Figure 16:
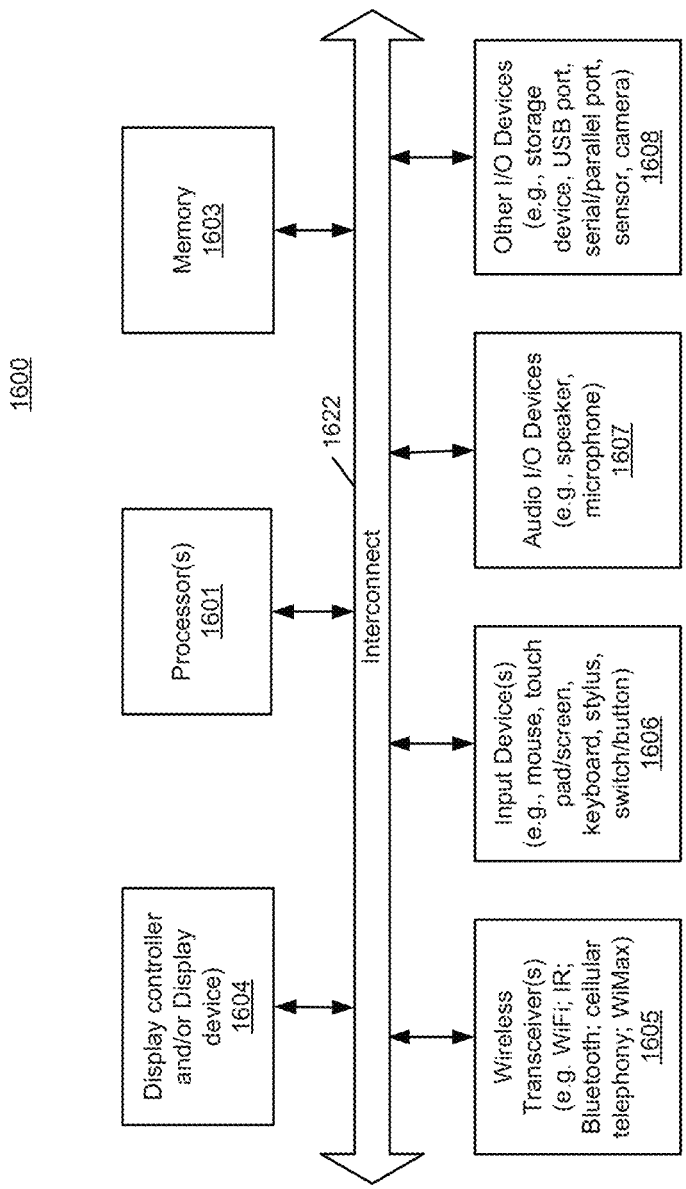
FIG. 16 illustrates a block diagram illustrating a data processing system which can be used as a computing device with any embodiment of the invention.

FIG. 16 is a block diagram illustrating a data processing system such as a computing system 1600 which may be used with one embodiment of the invention. For example, system 1600 may be implemented as part of a dynamically customized three dimensional geospatial visualization system as described in various embodiments herein. In one embodiment, system 1600 may represent the server or client machines, described herein. System 1600 may have a distributed architecture having dispersed units coupled through a network, or all of its components may be integrated into a single unit.

For example, computing system 1600 may represent any of data processing systems described above performing any of the processes or methods described above. System 1600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1600 is intended to show a high level view of many components of the computer system. However, it is to be understood that additional or fewer components may be present in certain implementations and furthermore, different arrangement of the components shown may occur in other implementations. System 1600 may represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 1600 includes processor 1601, memory 1603, and devices 1605-1608 via a bus or an interconnect 1622. Processor 1601 may represent a single processor or multiple processors with a single processor core or multiple processor cores included therein. Processor 1601 may represent one or more general-purpose processors such as a microprocessor, a central processing unit (CPU), or the like. More particularly, processor 1601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1601, which may be a low power multi-core processor socket such as an ultra low voltage processor, may act as a main processing unit and central hub for communication with the various components of the system. Such processor can be implemented as a system on chip (SoC). In one embodiment, processor 1601 may be an Intel® Architecture Core™-based processor such as an i3, i5, i10 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments.

Processor 1601 is configured to execute instructions for performing the operations and methods discussed herein. System 1600 further includes a graphics interface that communicates with graphics subsystem 1604, which may include a display controller and/or a display device.

Processor 1601 may communicate with memory 1603, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 2010-2E (published April 2010), or a next generation LPDDR standard to be referred to as LPDDR3 that will offer extensions to LPDDR2 to increase bandwidth. As examples, 2/4/16 gigabytes (GB) of system memory may be present and can be coupled to processor 1610 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 1603 can be a machine readable non-transitory storage medium such as one or more volatile storage (or memory) devices such as random-access memory (RAM), dynamic RAM (DRAM), synchronous DRAM (SDRAM), static RAM (SRAM), or other types of storage devices such as hard drives and flash memory. Memory 1603 may store information including sequences of executable program instructions that are executed by processor 1601, or any other device. For example, executable code and/or data of a variety of operating systems, device drivers, firmware (e.g., input output basic system or BIOS), and/or applications can be loaded in memory 1603 and executed by processor 1601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1600 may further include IO devices such as devices 1605-1608, including wireless transceiver(s) 1605, input device(s) 1606, audio IO device(s) 1607, and other IO devices 1608. Wireless transceiver 1605 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof.

Input device(s) 1606 may include a mouse, a touch-pad, a touch-sensitive screen (which may be integrated with display device 1604), a pointer device such as a stylus, and/or a keyboard (e.g., physical keyboard or a virtual keyboard displayed as part of a touch-sensitive screen). For example, input device 1606 may include a touch-screen controller coupled to a touch-screen. The touch-screen and touch-screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch-screen.

Audio IO device 1607 may include a speaker and/or a microphone to facilitate voice-enabled functions, such as voice-recognition, voice-replication, digital recording, and/or telephony functions. Other optional devices 1608 may include a storage device (e.g., a hard drive, a flash-memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1608 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1622 via a sensor hub (not shown), while other devices such as a keyboard or thermal sensor may be controlled by an embedded controller (not shown), dependent upon the specific configuration or design of system 1600.

To provide for persistent storage of information such as data, applications, one or more operating systems and so forth, a mass storage (not shown) may also couple to processor 1601. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1601, e.g., via a serial peripheral interface (SPI). This flash device may provide for non-volatile storage of system software, including basic input/output software (BIOS) as well as other firmware of the system.

Note that while system 1600 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, apparatuses, and computer readable medium are described to implement a dynamically customized three dimensional geospatial visualization system. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A method, comprising:
   determining, by a computing device, at least one area of interest of a user; dynamically customizing a global positioning system (GPS) coordinated 3D point cloud data related to a location based on the determining of the at least one area of interest of the user, wherein the 3D point cloud data includes at least one feature;
   transmitting the GPS coordinated 3D point cloud data related to the location; periodically determining the GPS coordinates of the user within the 3D point cloud data; determining features associated with the at least one area of interest of the user based on proximity of the user from the at least one feature within the 3D point cloud, wherein the features associated with the at least one area of interest of the user is further determined by a global ranking associated with the at least one area of interest, wherein the global ranking is determined by calculating a normalized likelihood factor;
   determining, based on the GPS coordinates of the user, whether updated 3D point cloud data needs to be transmitted; and
   transmitting the 3D point cloud data when it is determined that an updated 3D point cloud data needs to be transmitted;
   wherein the at least one area of interest of the user is determined by a profile information of the user, and wherein the normalized likelihood factor is represented by:

$$D\text{norm},i,J=(1/\min\{dni,J,K\})\max\{D\text{norm},i,J\},$$

wherein Dnorm,i,J is the normalized likelihood factor, min {dni,J.K) is the smallest distance of user i from cluster K in feature J and max {Dnormi,J} is the highest normalized likelihood factor value for user i and feature J, and wherein the user is represented by user i and the at least one feature is represented by feature J, and wherein a plurality of user vectors are grouped together to form cluster K.

2. The method of claim 1, wherein the at least one area of interest of the user is determined based on at least one of an action, behavior, or preference of the user.

3. The method of claim 1, wherein the 3D point cloud data is dynamically customized based on the at least one area of interest of the user in placeholder locations.

4. The method of claim 3, wherein the placeholder locations in a store are determined by a merchant user.

5. The method of claim 1, wherein the at least one area of interest of the user is refined based on repeated or frequent actions of the user.

6. The method of claim 1, wherein the 3D point cloud data relates to realistic geographical location settings or fantasized geographical location settings, or a combination thereof.

7. A system, comprising:
   a memory device;
   a processing system coupled to the memory device, wherein the processing system is configured to: determine at least one area of interest of a user,
   dynamically customize a global positioning system (GPS) coordinated 3D point cloud data related to a location based on the determining of the at least one area of interest of the user, wherein the 3D point cloud data includes at least one feature,
   transmit the GPS coordinated 3D point cloud data related to the location, periodically determine the GPS coordinates of the user within the 3D point cloud data,
   determining features associated with the at least one area of interest of the user based on proximity of the user from the at least one feature within the 3D point cloud, wherein the features associated with the at least one area of interest of the user is further determined by a global ranking associated
   with the at least one area of interest, wherein the global ranking is
   determined by calculating a normalized likelihood factor, and wherein when the user is within a predetermined distance from the at least one
   feature within the 3D point cloud data, associating the at least one feature with the at least one area of interest of the user;
   determine, based on the GPS coordinates of the user, whether updated 3D point cloud data needs to be transmitted, and transmit the 3D point cloud data when it is determined that an updated 3D point cloud data needs to be transmitted;

wherein the at least one area of interest of the user is determined by a profile information of the user, and wherein the normalized likelihood factor is represented by:

$$D\text{norm},i,J = (1/\min\{dni,J,K\})\max\{D\text{norm},i,J\},$$

wherein Dnorm,i,J is the normalized likelihood factor, min {dni,J.K) is the smallest distance of user i from cluster K in feature J and max {Dnormi,J} is the highest normalized likelihood factor value for user i and feature J, and wherein the user is represented by user i and the at least one feature is represented by feature J, and wherein a plurality of user vectors are grouped together to form cluster K.

8. The system of claim 7, wherein the at least one area of interest of the user is determined based on at least one of an action, behavior, or preference of the user.

9. The system of claim 7, wherein the 3D point cloud data is dynamically customized based on the at least one area of interest of the user in placeholder locations.

10. The system of claim 9, wherein the placeholder locations in a store are determined by a merchant user.

11. The system of claim 7, wherein the at least one area of interest of the user is refined based on repeated or frequent actions of the user.

12. The system of claim 7, wherein the 3D point cloud data relates to realistic geographical location settings or fantasized geographical location settings, or a combination thereof.

13. A non-transitory computer readable medium comprising instructions which when executed by a processing unit having at least one core, performs a method comprising:

determining, by a computing device, at least one area of interest of a user; dynamically customizing a global positioning system (GPS) coordinated 3D point cloud data related to a location based on the determining of the at least one area of interest of the user, wherein the 3D point cloud data includes at least one feature;

transmitting the GPS coordinated 3D point cloud data related to the location; periodically determining the GPS coordinates of the user within the 3D point cloud data; determining features associated with the at least one area of interest of the user based on proximity of the user from the at least one feature within the 3D point cloud, wherein the features associated with the at least one area of interest of the user is further determined by a global ranking associated with the at least one area of interest, wherein the global ranking is determined by calculating a normalized likelihood factor; and wherein when the user is within a predetermined distance from the at least one feature within the 3D point cloud data, associating the at least one feature with the at least one area of interest of the user;

determining, based on the GPS coordinates of the user, whether updated 3D point cloud data needs to be transmitted;

transmitting the 3D point cloud data when it is determined that an updated 3D point cloud data needs to be transmitted;

wherein the at least one area of interest of the user is determined by a profile information of the user, and wherein the normalized likelihood factor is represented by:

$$D\text{norm},i,J = (1/\min\{dni,J,K\})\max\{D\text{norm},i,J\},$$

wherein Dnorm,i,J is the normalized likelihood factor, min {dni,J.K) is the smallest distance of user i from cluster K in feature J and max {Dnormi,J} is the highest normalized likelihood factor value for user i and feature J, and wherein the user is represented by user i and the at least one feature is represented by feature J, and wherein a plurality of user vectors are grouped together to form cluster K.

14. The non-transitory computer readable medium of claim 13, wherein the at least one area of interest of the user is determined based on at least one of an action, behavior, or preference of the user.

15. The non-transitory computer readable medium of claim 13, wherein the 3D point cloud data is dynamically customized based on the at least one area of interest of the user in placeholder locations.

16. The non-transitory computer readable medium of claim 15, wherein the placeholder locations in a store are determined by a merchant user.

17. The non-transitory computer readable medium of claim 13, wherein the at least one area of interest of the user is refined based on repeated or frequent actions of the user.

* * * * *